US012067898B2

(12) United States Patent
Yang et al.

(10) Patent No.: US 12,067,898 B2
(45) Date of Patent: Aug. 20, 2024

(54) INTERACTIVE ENVIRONMENTS USING VISUAL COMPUTING AND IMMERSIVE REALITY

(71) Applicant: Intel Corporation, Santa Clara, CA (US)

(72) Inventors: Shao-Wen Yang, San Jose, CA (US); Addicam V. Sanjay, Gilbert, AZ (US); Karthik Veeramani, Hillsboro, OR (US); Gabriel L Silva, Phoenix, AZ (US); Marcos P. Da Silva, Chandler, AZ (US); Jose A. Avalos, Chandler, AZ (US); Stephen T. Palermo, Paradise Valley, AZ (US); Glen J. Anderson, Beaverton, OR (US); Meng Shi, Hillsboro, OR (US); Benjamin W. Bair, Hillsboro, OR (US); Pete A. Denman, Portland, OR (US); Reese L. Bowes, Hillsboro, AZ (US); Rebecca A. Chierichetti, Hillsboro, OR (US); Ankur Agrawal, Jaipur (IN); Mrutunjayya Mrutunjayya, Hillsboro, OR (US); Gerald A. Rogers, Chandler, AZ (US); Shih-Wei Roger Chien, Kaohsiung (TW); Lenitra M. Durham, Beaverton, OR (US); Giuseppe Raffa, Portland, OR (US); Irene Liew, Portland, OR (US); Edwin Verplanke, Queen Creek, AZ (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 17/256,105

(22) PCT Filed: Sep. 28, 2018

(86) PCT No.: PCT/US2018/053644
§ 371 (c)(1),
(2) Date: Dec. 24, 2020

(87) PCT Pub. No.: WO2020/068132
PCT Pub. Date: Apr. 2, 2020

(65) Prior Publication Data
US 2021/0272467 A1    Sep. 2, 2021

(51) Int. Cl.
*G06F 9/38* (2018.01)
*G06F 9/455* (2018.01)
(Continued)

(52) U.S. Cl.
CPC ........... *G09B 5/067* (2013.01); *G06F 9/3877* (2013.01); *G06F 9/45558* (2013.01);
(Continued)

(58) Field of Classification Search
CPC .......... G09B 5/067; G06F 9/3877; G06F 9/45558; G06F 2009/45562; G06F 2009/4557;
(Continued)

(56) References Cited

U.S. PATENT DOCUMENTS

| 956,106 A | 4/1910 | Kopper |
| 2007/0233455 A1 | 10/2007 | Zimmer et al. |

(Continued)

FOREIGN PATENT DOCUMENTS

| KR | 20120079207 A | 7/2012 |
| KR | 20160044315 A | 4/2016 |
| WO | 2015050938 A2 | 4/2015 |

OTHER PUBLICATIONS

Fredy et al. "Designing a Collision Detection Accelerator on a Heterogeneous CPU-FPGA Platform," 2017 (Year: 2017).*
(Continued)

*Primary Examiner* — Sisley N Kim
(74) *Attorney, Agent, or Firm* — Alliance IP, LLC

(57) ABSTRACT

In one embodiment, an apparatus comprises a memory and a processor. The memory is to store sensor data, wherein the sensor data is captured by a plurality of sensors within an educational environment. The processor is to: access the sensor data captured by the plurality of sensors: identify a student within the educational environment based on the sensor data: detect a plurality of events associated with the student based on the sensor data, wherein each event is (Continued)

indicative of an attention level of the student within the educational environment: generate a report based on the plurality of events associated with the student; and send the report to a third party associated with the student.

20 Claims, 25 Drawing Sheets

(51) Int. Cl.
  *G06T 19/00* (2011.01)
  *G09B 5/06* (2006.01)
(52) U.S. Cl.
  CPC .................. *G06T 19/006* (2013.01); *G06F 2009/45562* (2013.01); *G06F 2009/4557* (2013.01); *G06F 2009/45595* (2013.01)
(58) Field of Classification Search
  CPC ........... G06F 2009/45595; G06F 3/011; G06F 3/016; G06F 3/017; G06F 3/167; G06T 19/006; G06Q 50/20
  See application file for complete search history.

(56) References Cited

U.S. PATENT DOCUMENTS

| | | |
|---|---|---|
| 2013/0125125 A1 | 5/2013 | Karino et al. |
| 2013/0226674 A1 | 8/2013 | Field et al. |
| 2017/0060607 A1* | 3/2017 | Hollinger .............. G06F 9/5044 |
| 2017/0371698 A1 | 12/2017 | Paolino et al. |
| 2018/0267842 A1* | 9/2018 | Gou .................... G06F 13/1663 |
| 2018/0276394 A1* | 9/2018 | Nair ...................... G06F 21/575 |
| 2019/0034363 A1* | 1/2019 | Palermo .............. G06F 13/4022 |

OTHER PUBLICATIONS

PCT International Preliminary Report on Patentability in PCT International Application Serial No. PCT/US2018/053644 mailed on Mar. 30, 2021 (11 pages).

PCT International Search Report and Written Opinion in PCT International Application Serial No. PCT/US2018/053644 mailed on Jun. 28, 2019 (17 pages).

* cited by examiner

INTERACTIVE ENVIRONMENTS USING VISUAL COMPUTING AND IMMERSIVE REALITY

CROSS-REFERENCE TO RELATED APPLICATIONS

This application is a national stage application under 35 U.S.C. § 371 of PCT International Application Serial No. PCT/US2018/053644, filed on Sep. 28, 2018, and entitled "INTERACTIVE ENVIRONMENTS USING VISUAL COMPUTING AND IMMERSIVE REALITY" which is hereby incorporated by reference herein in its entirety.

FIELD OF THE SPECIFICATION

This disclosure relates in general to the field of interactive computing, and more particularly, though not exclusively, to interactive environments using visual computing and immersive reality.

BACKGROUND

Interactive computing environments are becoming increasingly popular, particularly in collaborative settings such as schools and offices. Existing solutions, however, are often limited in terms of both functionality and compute capabilities.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
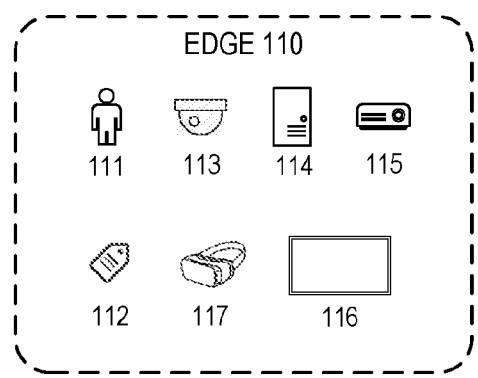
FIG. 1 illustrates an example computing system for the interactive environments described throughout this disclosure.
Figure 1:
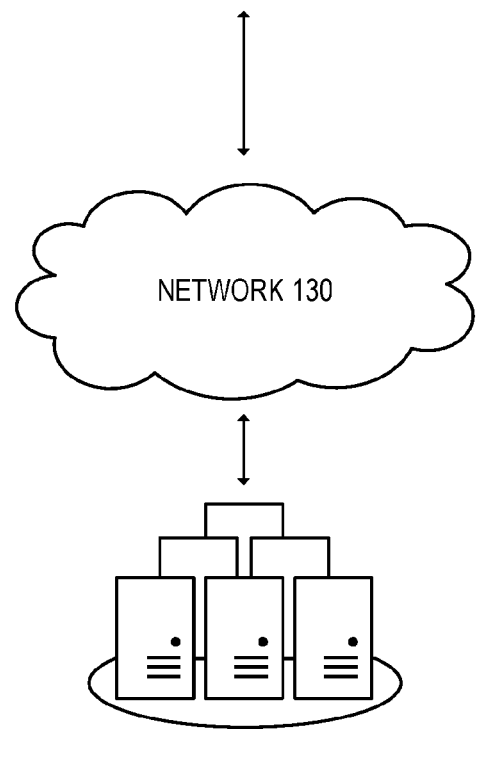

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Example embodiments that may be used to implement the features and functionality of this disclosure will now be described with more particular reference to the attached FIGURES.

Interactive Computing Environments

FIG. 1 illustrates an example computing system 100 for the interactive environments described throughout this disclosure. For example, this disclosure presents various embodiments of interactive environments (e.g., classrooms, workplaces, retail stores) that are implemented using visual computing, augmented reality (AR), and/or virtual reality (VR) technology. Accordingly, computing system 100 may be used to implement the interactive environments described throughout this disclosure. For example, in some embodiments, computing system 100 may be used to implement the attention-driven student video summarization described in connection with FIGS. 2-3; the responsive classroom described in connection with FIGS. 4-5; and/or the multi-session interactive and immersive reality platform described in connection with FIGS. 6-12.

In the illustrated embodiment, computing system 100 includes edge resources 110, cloud resources 120, and communication network(s) 130, as described further below.

The edge 110 may include any type of device or thing positioned at or near the edge of a communication network (e.g., network 130), including people 111, radio frequency identification (RFID) tags 112, sensors 113, processing resources 114, displays 116, projectors 115, and virtual reality (VR) systems 117, among other examples. Sensors 113 may include any type of device capable of capturing or detecting information associated with a surrounding environment, including cameras and other vision sensors, microphones, motion sensors, and RFID readers and antennas, among other examples. Processing resources 114 may include any type of edge processing device, including on-premise servers, appliances, gateways, personal computers, and mobile devices, among other examples. Displays 116 may include any type of device capable of displaying visual content, including monitors, televisions, interactive whiteboards (IWBs), and projection screens, among other examples. Projectors 115 may include any type of device capable of projecting visual content (e.g., video, graphics, immersive reality content) on a projection surface, such as a projection wall or screen (e.g., projection screen 116). Virtual reality (VR) systems 117 may include any type of device capable of processing, displaying, and/or interacting with immersive reality content (e.g., virtual reality (VR) or augmented reality (AR) content), including virtual reality (VR) headsets, virtual reality (VR) controllers, and AR/VR processing devices, among other examples.

Cloud computing resources 120 may include any resources or services that are hosted remotely over a network, which may otherwise be referred to as in the "cloud." In some embodiments, for example, cloud resources 120 may be remotely hosted on servers in a datacenter (e.g., application servers, database servers). In general, cloud resources 120 may include any resources, services, and/or functionality that can be utilized by or for components of computing system 100, such as edge resources 110.

Communication network(s) 130 may be used to facilitate communication between components of computing system 100, such as between edge 110 and cloud 120 resources. In various embodiments, computing system 100 may be implemented using any number or type of communication network(s) 130, including local area networks, wide area networks, public networks, the Internet, cellular networks, Wi-Fi networks, short-range networks (e.g., Bluetooth or ZigBee), and/or any other wired or wireless communication networks or mediums.

Any, all, or some of the computing devices of computing system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within computing system 100 of FIG. 1 may be utilized in each alternative implementation of the present disclosure. Additionally, one or more of the elements described in connection with the examples of FIG. 1 may be located external to computing system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of computing system 100 are described further in connection with the remaining FIGURES. Accordingly, it should be appreciated that computing system 100 of FIG. 1 may be implemented with any aspects of the embodiments described throughout this disclosure.

Attention-Driven Personalized Student Activity Summaries

Smart classrooms and conference rooms are emerging to increase performance, productivity, and/or collaboration in the school and workplace. For example, interactive whiteboards (IWBs) (e.g., interactive whiteboard 116 of FIG. 1) may be leveraged to make workspaces more collaborative, interactive, and productive. An IWB may include a touch-enabled display (e.g., to capture, digitize, and/or display content on the whiteboard), one or more processors, and a variety of onboard sensors (e.g., audio, video, and/or motion sensors). In this manner, IWBs enable a broad universe of novel applications and use cases, such as student attendance tracking in schools.

Another valuable use case in schools is enabling parents to easily learn about their child's activity and participation in class so that the parents can respond in a way that complements their child's school education. For example, a parent can reinforce a subject that the child is struggling with by learning whether the child is actively engaging in each class and in what aspects. In some cases, video footage of a child's classroom behavior may be captured (e.g., using cameras and/or other vision sensors) and shared with a parent for this purpose. Recording and sharing raw video with the parent, however, can be unrealistic and can pose privacy concerns.

For example, a parent is unlikely to review eight hours of video footage on a daily basis to learn about their child's classroom activity or behavior. Thus, raw video of students generally is not useful in the absence of automated video summarization, as manually reviewing the raw video in its entirety is an unrealistic, time-consuming, and daunting task.

Even if the raw video footage is shortened or summarized, many types of student behavior (e.g., student attention in class) cannot be accurately detected, captured, and/or represented using cameras alone (e.g., without leveraging other modalities). Thus, many pertinent or interesting events associated with a student may be inadvertently omitted, leading to many missed events or "false negatives" for the student.

Further, other students will inevitably be captured in the raw video footage of a particular student, which can lead to privacy violations. For example, raw video footage or even video clip summaries of a particular parent's child are likely to capture and record students of other parents as well, thus violating the privacy of those students.

Accordingly, this disclosure presents embodiments for generating personalized attention-driven video summaries of students during school. For example, the described embodiments leverage sensor fusion technology with multimodal sensors (e.g., sensors embedded within an IWB or otherwise deployed in a classroom) to automatically generate video summaries of individual students and their classroom activity. In some embodiments, for example, videos may be summarized in both time and space, with key frames identified not only from the video itself but also using other modalities, such as RFID sensors (e.g., to identify students based on RFID-enabled student ID cards or tags), motion sensors (e.g., to detect movement, activity, or gestures of students), audio sensors (e.g., to detect when students speak and what they say), and so forth. This results in a short video clip that includes only the target student and not any other students, thus preserving the privacy of other students.

Accordingly, the described solution provides many advantages over other approaches. For example, the described solution is more practical and realistic, as it generates videos with reasonable lengths that parents can easily review and comprehend in a short amount of time. The described solution is also very accurate, as it leverages multimodal video summarization technology to detect and capture events that are difficult to detect- and thus often omitted-when using video alone. Further, the described solution is privacy-preserving, as videos are summarized not only temporally (e.g., by removing uneventful video frames), but also spatially (e.g., by trimming or filtering irrelevant portions of eventful frames), thus enabling irrelevant targets—such as other students—to be filtered out for privacy preservation purposes. Moreover, this solution is device-free, as it does not require the students to carry individual computing devices, such as tablets, phones, or smart tracking devices.

Figure 2:
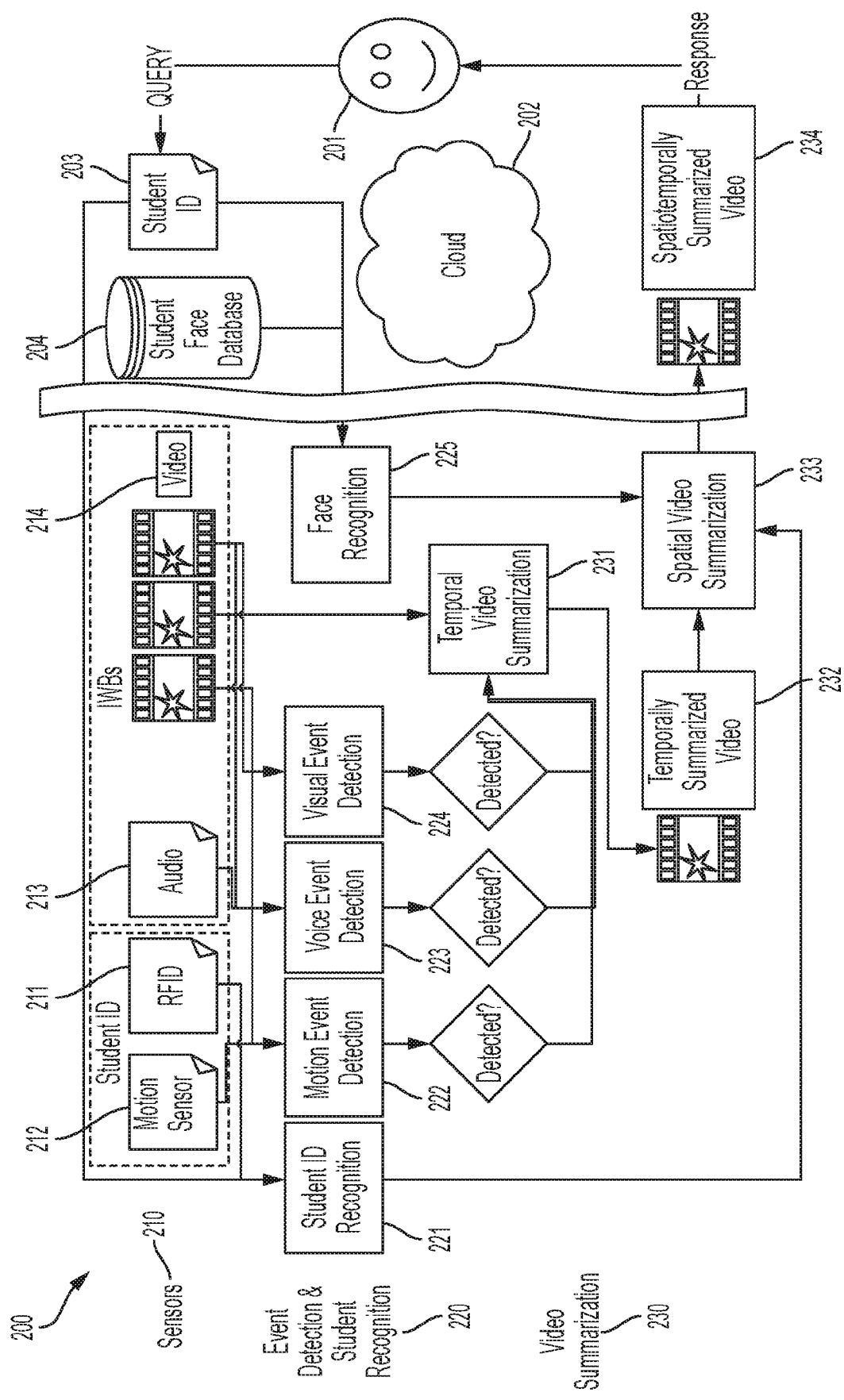
FIG. 2 illustrates an example dataflow for generating attention-driven personalized student activity summaries.

FIG. 2 illustrates an example dataflow 200 for generating attention-driven personalized student activity summaries.

For example, the illustrated dataflow 200 leverages various types of sensors 210, a database of student faces 204, and RFID-enabled student identification tags (e.g., RFID student ID cards), as described further below. In the illustrated embodiment, the sensors 210 include an RFID sensor 211, motion sensor 212, audio sensor 213, and video sensor 214. In other embodiments, however, the described solution can be implemented using any other types of sensors or modalities that enable the identity and actions of students to be detected and recognized, such as other modalities for performing motion detection, event recognition, facial recognition, student ID recognition, and so forth.

In the illustrated dataflow, the sensors 210 are deployed within an educational or learning environment, such as a school classroom or another school facility. In some embodiments, for example, some or all of the sensors 210 may be embedded within a particular device in a classroom, such as an interactive whiteboard (IWB), while others may be deployed as separate or standalone sensors within the classroom.

In the illustrated example, the dataflow 200 begins with a query requesting a student activity summary for a particular student, which may be sent by a particular user 201 and received in the cloud 202. For example, the query may be a request from a third party, such as a parent 201 or other appropriate personnel, for a student activity summary or report associated with that parent's child. In some embodiments, the query may identify the particular student based on a student ID 203 assigned to that student. Further, in some embodiments, the query may contain authorization credentials (e.g., an access token or username/password) that are required to access information associated with that student, thus ensuring that the student's information is only accessible to the parents of the student and/or other appropriate personnel.

In response to the query, an attention-driven personalized student activity summary or report is generated and/or provided to the requesting third party 201 (e.g., the parent or another authorized user). In some cases, student activity summaries may be generated in real-time, stored in the cloud 202, and then retrieved on-demand in response to queries. In other cases, however, student activity summaries may be generated on-demand (e.g., using stored sensor data) when the corresponding queries are received.

In the illustrated dataflow 200, for example, various sensors 210 are used to capture data associated with the particular educational environment (e.g., a school or classroom), student identification and event detection 220 are performed based on the captured sensor data, and video summarization 230 can then be performed based on video footage of events that are detected for a particular student, as described further below.

In the illustrated example, the sensors 210 include an RFID sensor 211, motion sensor 212, audio sensor 213, and video sensor 214. Moreover, the data captured by these sensors 210 can be used for event detection and student recognition 220 purposes, such as detecting motion, voice, and/or visual events, identifying the students involved in the detected events, and so forth.

Motion event detection 222 can be performed based on data captured by motion sensors 212, RFID sensors 211, and/or video sensors 214. For example, based on the data captured by these sensors, certain movements may be detected, such as a student entering or leaving a classroom, raising a hand, and so forth.

Voice event detection 223 can be performed based on audio captured by audio sensors 213 (e.g., a microphone). In some embodiments, for example, notable voice events may be detected in the captured audio using (unsupervised) saliency detection or (supervised) keyword detection (e.g., using a machine learning model).

Visual event detection 224 can be performed based on visual data captured by vision sensors 214 (e.g., cameras). In some embodiments, for example, notable events may be detected in the captured visual data using (unsupervised) keyframe detection or (supervised) activity or behavior detection (e.g., based on a machine learning model). In some embodiments, for example, a machine learning model (e.g., a convolutional neural network) could be trained to recognize or detect certain types of events within visual data.

Student ID recognition 221 and/or face recognition 225 can be used to identify students in order to perform video summarization (e.g., temporally and spatially) for individual students, as described further below. In some embodiments, for example, student ID recognition 221 can be performed based on the RFID-enabled student IDs that are detected by RFID sensor 211. Moreover, face recognition 225 can be performed by matching faces in the video footage captured by the vision sensors 214 with those in the student face database 204 (e.g., using a machine learning model trained to perform facial recognition on the faces in the student face database 204).

In general, with respect to event detection, any types of signal processing and/or analysis may be used to identify events based on sensor data captured by a particular sensor or combination of sensors. In some embodiments, for example, various machine learning models may be designed and trained to recognize certain events based on sensor data from various types of sensor(s). The detected events can involve any aspect or feature of the physical environment that can be derived from the sensor data captured by the available sensors. Within an educational environment, for example, events that indicate the attention level of a student are likely to be the most useful. Examples of these events include detecting or identifying the presence or identity of a student or teacher, actions (e.g., raising a hand, talking), behavior (e.g., sleeping, listening to earphones), gestures (e.g., nodding, looking away from the teacher), verbal communications (e.g., questions asked to a teacher, collaborative student discussions, off-topic student conversations), and so forth.

When an event is detected (e.g., a motion event 222, voice event 223, and/or visual event 224), temporal video summarization 231 is performed to generate a video summary of the detected event. For example, the video footage captured by a vision sensor or camera 214 may be summarized into a disjointed set of continuous video frames depicting the detected event (e.g., by identifying the detected event within the video footage and extracting the corresponding video frames to create a video clip). In some embodiments, for example, the detected event may be identified within the video footage based on the video frames captured at or around the time the detected event occurred and/or using computer vision recognition techniques. As a result, a temporally summarized video 232 of the event is generated.

Spatial video summarization 233 is then performed using the temporally summarized videos 232 by identifying video summaries corresponding to a target student, pinpointing the target student within the summarized video frames, and filtering out other irrelevant pixels within those frames (e.g., students other than the target student).

For example, student ID recognition 221 may be used to identify one or more video clips or summaries that correspond to a target student identified in a query from a parent 201. Moreover, face recognition 225 may then be used to pinpoint the target student within the frames of the video summaries (e.g., using facial recognition based on the student face database 204). In this manner, the relevant portions of the video frames representing the target student and the associated events can be preserved, while other irrelevant and/or privacy-sensitive portions of the video frames (e.g., the faces of other students) can be filtered, removed, or masked.

In various embodiments, for example, any appropriate sanitization or filtering technique can be used to filter out or mask irrelevant and/or privacy-sensitive information (e.g., privacy-sensitive visual data that indicates the identities of other students). For example, the video frames may be trimmed or cropped such that only the target student is visible in the resulting frames and all other students are removed. As another example, the faces of students other than the target student may be masked in the video frames, such as by adding random noise to distort the faces, blurring the faces, removing the pixels corresponding to the faces (e.g., blacking out or redacting those pixels), replacing the faces with avatars (e.g., avatars that generally resemble those students without revealing their identities), and so forth. In this manner, the video summary is spatially sanitized to filter out or mask pixels containing irrelevant and/or privacy-sensitive information. Moreover, in some embodiments, audio associated with the resulting video summary may also be filtered to remove voices of students other than the target student (e.g., using voice recognition).

As a result, a spatiotemporally summarized video 234 is generated for the target student, which is temporally summarized to include only the noteworthy events detected for that particular student, and spatially summarized to filter out irrelevant and/or privacy-sensitive information associated with other students. The resulting video summary or report 234 for the target student is then provided in response to the particular third party 201 that submitted the original query (e.g., a parent or another authorized user).

Figure 3:
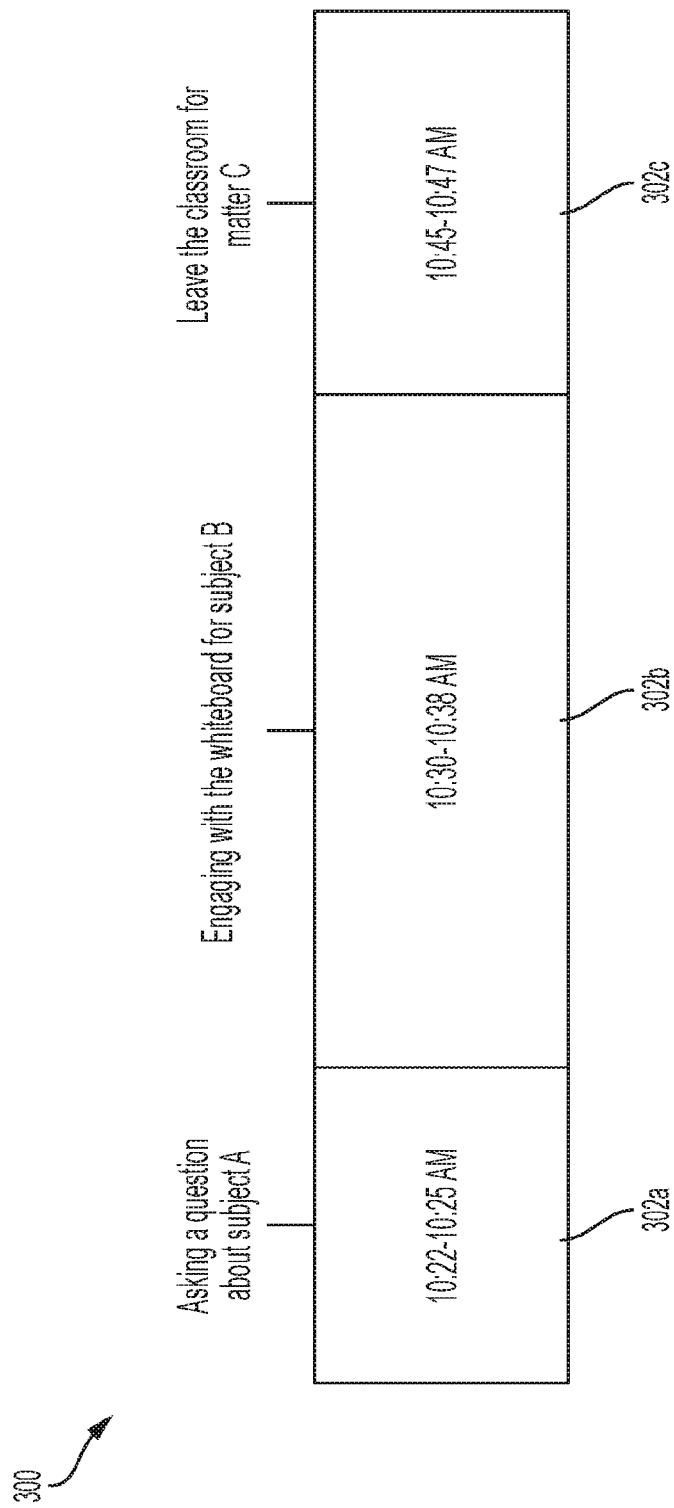
FIG. 3 illustrates an example of a video-based student activity summary generated using personalized attention-driven video summarization.

FIG. 3 illustrates an example of a video-based student activity summary 300 generated using personalized attention-driven video summarization. In some embodiments, for example, video summary 300 may be generated using the dataflow of FIG. 2.

In the illustrated example, video summary 300 includes a collection of video clips 302a-c portraying three separate events that were captured and detected for a particular student. For example, video clip 302a contains footage of an event that occurred from 10:22-10:25 AM, where the student asked a question about subject A. Video clip 302b contains footage of an event that occurred from 10:30-10:38 AM, where the student engaged with the interactive whiteboard (IWB) regarding subject B. Video clip 302c contains footage of an event that occurred from 10:45-10:47 AM, where the student leaves the classroom for matter C.

In various embodiments, summary 300 may be represented using video and/or any other suitable format in conjunction with video or as a replacement for video (e.g., audio or text). For example, in some embodiments, summary 300 may be represented using textual or verbal descriptions of the detected events for the target student, either with or without the corresponding video clips. The textual or verbal descriptions, for example, may be generated by interpreting the content represented in the video clips (e.g., using machine learning models, convolutional neural networks (CNNs), and/or other video recognition techniques), and then generating textual or verbal descriptions corresponding to the interpreted content (e.g., using recurrent neural networks (RNNs)). Similarly, summary 300 may also be represented using audio associated with the detected events for the target student (e.g., audio captured during the actual events), either with or without the corresponding video clips.

Responsive Classroom

Insights about what students can do to improve their academic weaknesses can provide significant value to students and schools. To date, this process has generally been manual and fairly simplistic.

For example, a teacher typically observes students over a period of time and offers advice to the students and/or their parents based on the observations. This manual process is non-interactive, cumbersome, and subjective, as it is based exclusively on a teacher's own perspective or view of a student, and a lengthy turnaround time is often required before any feedback or advice can be provided to a parent. The effectiveness of this approach also requires a teacher to spend enough time observing each individual student over a limited timeframe to provide meaningful feedback and advice, which is not always realistic, particularly for a teacher with a large number of students.

A teacher may also derive simple statistical observations about a student's performance, such as performance trends derived from the student's prior test scores. While these trends may indicate the direction where the student's performance is headed, they often fail to reveal the cause of the student's performance problems, which may be crucial to helping the student improve. Instead, these trends simply serve as points of proof that the student's performance does need improvement. Thus, simple statistics based on performance records alone are often insufficient for deriving meaningful insights that can help students improve their performance, as those statistics simply reveal performance trends without identifying an underlying cause or a course of correction.

Accordingly, this disclosure presents embodiments of a responsive classroom that allows parents to interact with a child in real time and address any questions or concerns relating to the child's performance. The closed-loop nature of this paradigm helps achieve performance improvements in a faster and more effective manner than traditional approaches.

In some embodiments, for example, the responsive classroom may be implemented using a system or device deployed in an educational environment, such as an interactive whiteboard (IWB) deployed in a classroom (e.g., interactive whiteboard 116 of FIG. 1). For example, an IWB may include a touch-enabled display (e.g., to capture, digitize, and/or display content on the whiteboard), a processor, and a collection of onboard sensors, such as cameras pointed outwards from the IWB towards the teacher and students, microphones, motion sensors, and so forth.

In this manner, the onboard sensors can capture a variety of information about the classroom environment, and that information can then be processed along with other available data (e.g., student performance records) using advanced artificial intelligence (AI) and/or machine learning (ML) techniques to derive insights into various aspects of the learning environment, such as a performance level of certain students. In some embodiments, for example, the sensor data may be fed to a cloud-based server (e.g., server 120 of FIG. 1) that derives the analytics and insights, or certain analytics and insights may be fully or partially derived on a local processor of the IWB. In this manner, computer vision is leveraged in connection with other available data (e.g., student performance records) to derive more advanced analytics and insights into student performance. In some embodiments, for example, a machine learning model may be trained to classify student performance based on detected events and student performance records. In this manner, the machine learning model may be used to derive a performance level for a particular student based on recently detected events associated with the student, and a report regarding the student's performance may then be generated and transmitted to an appropriate third party, such as a parent of the student.

Further, parents may be provided with sophisticated feedback in real time, and they are also allowed to participate in their child's classroom experience in real time. For example, the responsive classroom provides an edge-to-edge solution for connecting parents to their child's in-classroom activity in real time, which includes remote interactive interfaces that enable parents to participate in their children's school activities. In some embodiments, for example, a real-time notification may be sent to the parent of a student about a particular event involving the student, and real-time feedback may be received from the parent about the particular event.

Accordingly, the described solution provides many advantages over traditional approaches. For example, the described solution is more responsive, as the parents can be informed of their child's in-classroom activity in real time, and the described solution is also interactive, as the parents can participate in their child's in-classroom activity and respond to it appropriately.

Figure 4:
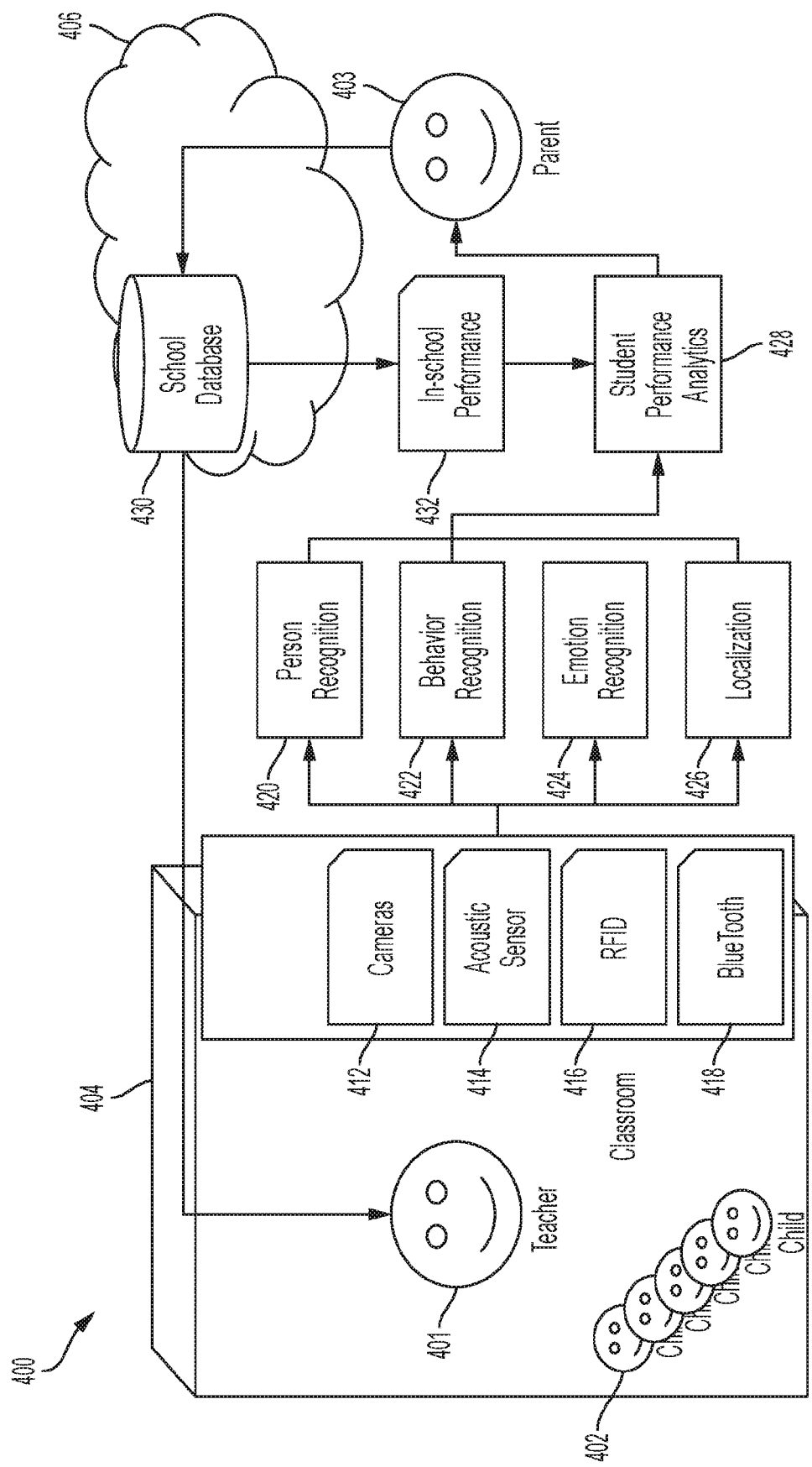
FIG. 4 illustrates an example workflow for deriving student performance insights in a responsive classroom.

FIG. 4 illustrates an example workflow 400 for deriving student performance insights in a responsive classroom. In the illustrated example, the responsive classroom is implemented using a variety of sensors and/or computing components 410 that are deployed within a classroom 404 or other learning environment, such as cameras 412, an acoustic sensor 414 (e.g., a microphone), an RFID sensor or reader 416, and a Bluetooth transceiver 418. In some embodiments, some or all of the sensors 410 may be embedded within a particular device in the classroom 404, such as an interactive whiteboard (IWB), while others may be deployed as separate or standalone sensors within the classroom 404.

In this manner, the sensors 410 can be used to capture various types of data associated with the classroom environment (e.g., visual data, sound, RFID signals from student IDs). Moreover, based on the data captured by the sensors 410, a computer vision backend (e.g., local/edge processors and/or cloud-based servers) can then be used to identify students 402 and detect their classroom activity and behavior.

For example, person recognition 420 can be performed to identify students 402 and/or teachers 401 in the classroom 404, such as by detecting RFID-enabled student IDs using RFID sensor(s) 416, and/or by performing facial recognition on the visual data captured by the cameras 412.

Moreover, behavior recognition 422 and emotion recognition 424 may be performed to detect the behavior and emotions of students 402. In some embodiments, for example, behavior and/or emotions may be detected by processing visual data captured by the cameras 412 using machine learning models that have been trained to recognize relevant behavior and emotions.

Further, localization 426 can be performed to determine the location of students 402 and/or teachers 401 within the classroom 404 (e.g., based on the visual data captured by the cameras 412, or signals associated with the RFID-enabled student IDs detected by RFID sensor(s) 416).

In this manner, the computer vision backend (e.g., in the IWB system) can detect various types of behavior, emotions, and/or gestures of each student, which can be grouped into categories and logged as events. To illustrate, the following are non-exhaustive examples of the types of categories and/or events that can be identified from student behavior:

1. Interactive events: gestures associated with interactive student behavior, such as raising a hand, asking a question, speaking to the teacher, listening or looking at the teacher;
2. Disengaged events: gestures associated with disengaged or inattentive student behavior, such as looking away from the teacher or whiteboard beyond a threshold amount of time, or sleeping;
3. Distractive events: gestures associated with distractive student behavior, such as talking to other students (e.g., in situations where group discussion is not expected), engaging with a smartphone, or listening to earphones.

In some embodiments, each event may be represented or associated with an event category, a time, a student ID, a teacher ID, and a class subject. Moreover, in some embodiments, the events for a particular student and/or class may be summarized, such as by assigning a score per category for a set of events (e.g., interaction: 0.3, disengaged/lack of attention: 0.7, distracted: 0.2 for student A during class hour B).

The past performance records 432 of the students 402 can be obtained separately (e.g., from a school database 430), and student performance analytics 428 can then be performed using the identified event data and the student performance records 432. For example, correlations can be derived from the identified event data and the performance records 432. In various embodiments, the correlations could be derived using simple rule engines, as well as more sophisticated machine learning models.

In some embodiments, for example, a machine learning model can be trained to classify the performance of each student given the inputs above, using their prior test and assignment scores as target labels. Alternatively, the machine learning model could use the teacher ID as the target label and the detected events from all students in the class as input (e.g., to assess the effectiveness of the teacher's teaching style based on whether the students are generally interactive/engaged or disinterested/distracted).

In this manner, machine learning inference can be run at periodic intervals on the recently detected events (e.g., once a month, or before a quiz/test date) to continuously assess student performance problems and provide insights to the relevant parties (e.g., parents 403). For example, if inference shows that a teacher's 401 class usually results in a large percentage of disengaged students 402, the head of the department could be informed via email. If a specific student 402 is found to be considerably distracted, the parents 403 of that student 402 could be notified.

Figure 5:
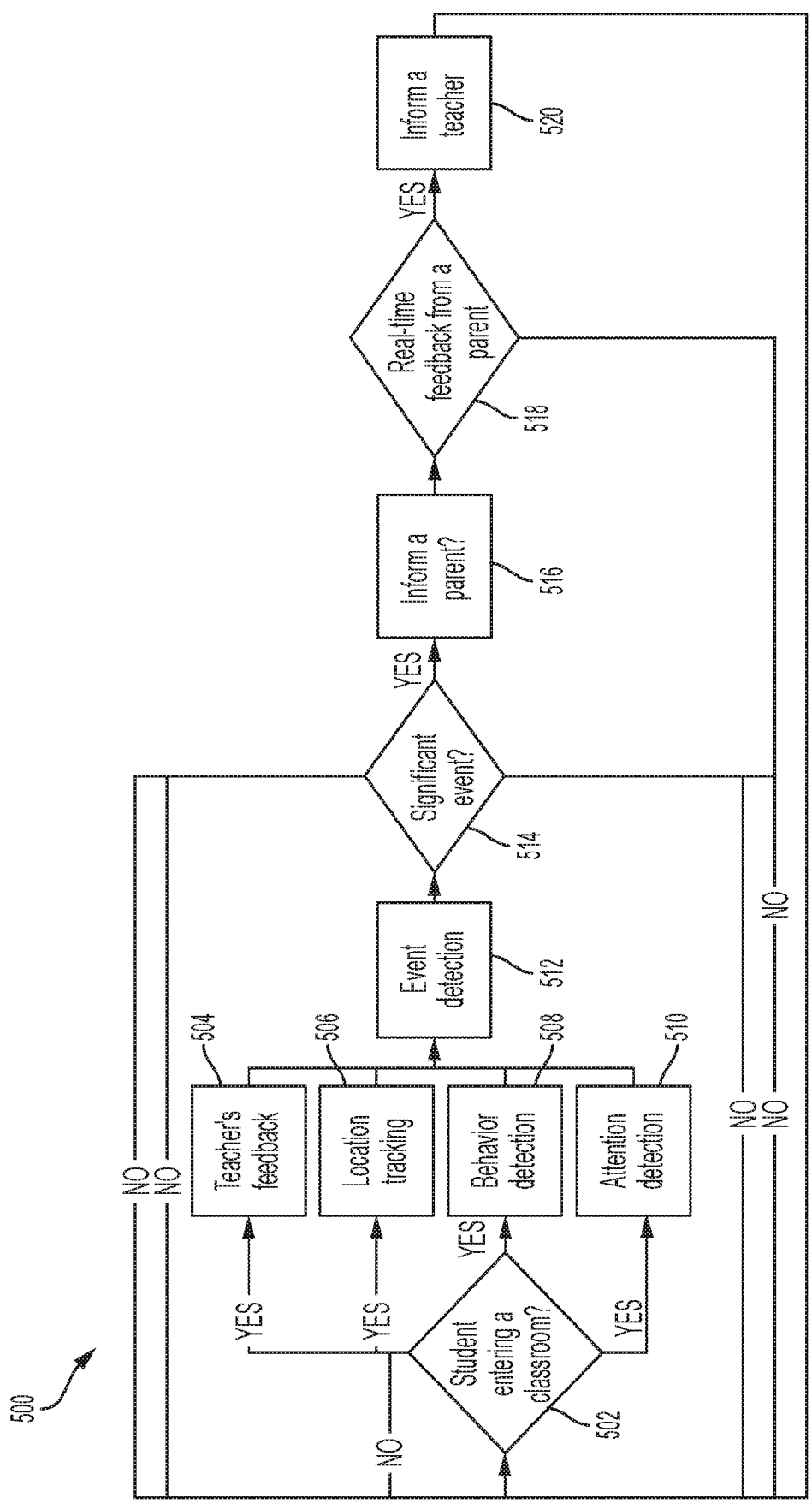
FIG. 5 illustrates an example process flow for real-time interaction with parents in a responsive classroom.

FIG. 5 illustrates an example process flow 500 for real-time interaction with parents in a responsive classroom. The process flow begins at block 502, where a classroom is monitored to determine when students enter the classroom. In some embodiments, for example, a student entering the classroom may be detected based on an RFID-enabled student ID card detected by an RFID reader, or based on visual data captured by a camera.

Once a student enters the classroom, the process flow proceeds to blocks 504, 506, 508, and 510, where teacher feedback is obtained for the student, and location tracking, behavior detection, and attention detection are performed for the student (e.g., using cameras, microphones, motion sensors, RFID sensors, location sensors, and so forth).

The process flow then proceeds to block 512, where an event associated with the student is detected based on the teacher's feedback and the location, behavior, and/or attention of the student (e.g., as obtained or detected in blocks 504, 506, 508, and 510).

The process flow then proceeds to block 514 to determine whether the event is significant or noteworthy. In some cases, for example, certain types of events that are relevant to the student's performance (e.g., interactive/attentive behavior, or disengaged/distracted behavior) may be deemed to be significant or noteworthy.

If the event is determined to be significant, the process flow then proceeds to block 516, where a parent of the student is notified about the event. In some embodiments, for example, a notification may be sent to the parent over a network, such as an email, text message, and/or other notification sent to the parent's smartphone or another associated device.

The process flow then proceeds to block 518 to determine whether any real-time feedback or participation is received from the parent. In some cases, for example, the parent may provide advice to the student or teacher, ask questions, observe the classroom environment, and so forth. For example, a user interface can be provided to allow the parent to participate in the classroom environment in real-time (e.g., via the interactive whiteboard, videoconferencing, and/or a smartphone or computer application).

If feedback or participation is received from the parent, the process flow proceeds to block 520 to inform the teacher, allowing the teacher to become involved, as appropriate.

At this point, the process flow may be complete. In some embodiments, however, the process flow may restart and/or certain blocks may be repeated. For example, in some embodiments, the process flow may restart at block 502 to continue detecting students that enter the classroom and events associated with those students.

Multi-Session Interactive and Immersive Reality Platform

Immersive reality technologies, such as augmented reality (AR) and virtual reality (VR), are evolving and becoming more complex, particularly through interaction between individual immersive sessions. Immersive multimodal sensing and sense-making projected sessions face significant computing and latency challenges, however, especially when individual immersive sessions interact. For example, immersive reality sessions for kids could leverage sense-making and projected compute capabilities to enable learning through interactive play, such as through natural interactions among children, things, and projected AR/VR images. Enabling individual immersive sessions to become interactive, however, is non-trivial.

In some cases, for example, interactive immersive reality sessions could be implemented using edge computing resources. Because edge-based approaches are not centralized in a datacenter, however, they lack the low-latency data sharing capabilities that are often required for interactive immersive reality sessions.

Accordingly, this disclosure presents various embodiments of a multi-session interactive and immersive reality platform, which addresses the multi-session latency and computational challenges associated with enabling interaction across individual immersive reality sessions.

Immersive reality experiences require considerable resources from a computation and memory perspective, along with the additional requirement of low latency, in order to implement the complete processing pipeline from sensing the environment (e.g., multimodal aspects) to producing the output projection. For example, supporting multiple AR/VR sessions that are both interactive and immersive requires low-latency high-bandwidth computing:

1. between or among immersive (PHY-Physical Network) and interactive (VM-Virtual Machine) sessions; and
2. between or among interactive (VM) to interactive (VM) sessions.

In the embodiments described throughout this disclosure, a multi-tiered architecture is used to address the networking and compute latencies that are required to simultaneously render and project physical objects locally AND locally represent physical objects from another location (and vise-versa).

In some embodiments, for example, a centralized data-center-centric solution is used to provide the low-latency compute and networking capabilities that are required to support multi-session interactive AR/VR applications. Accordingly, the described solution can be leveraged for a variety of immersive reality use cases and applications, such as an interactive kids space, among other examples.

Figure 6:
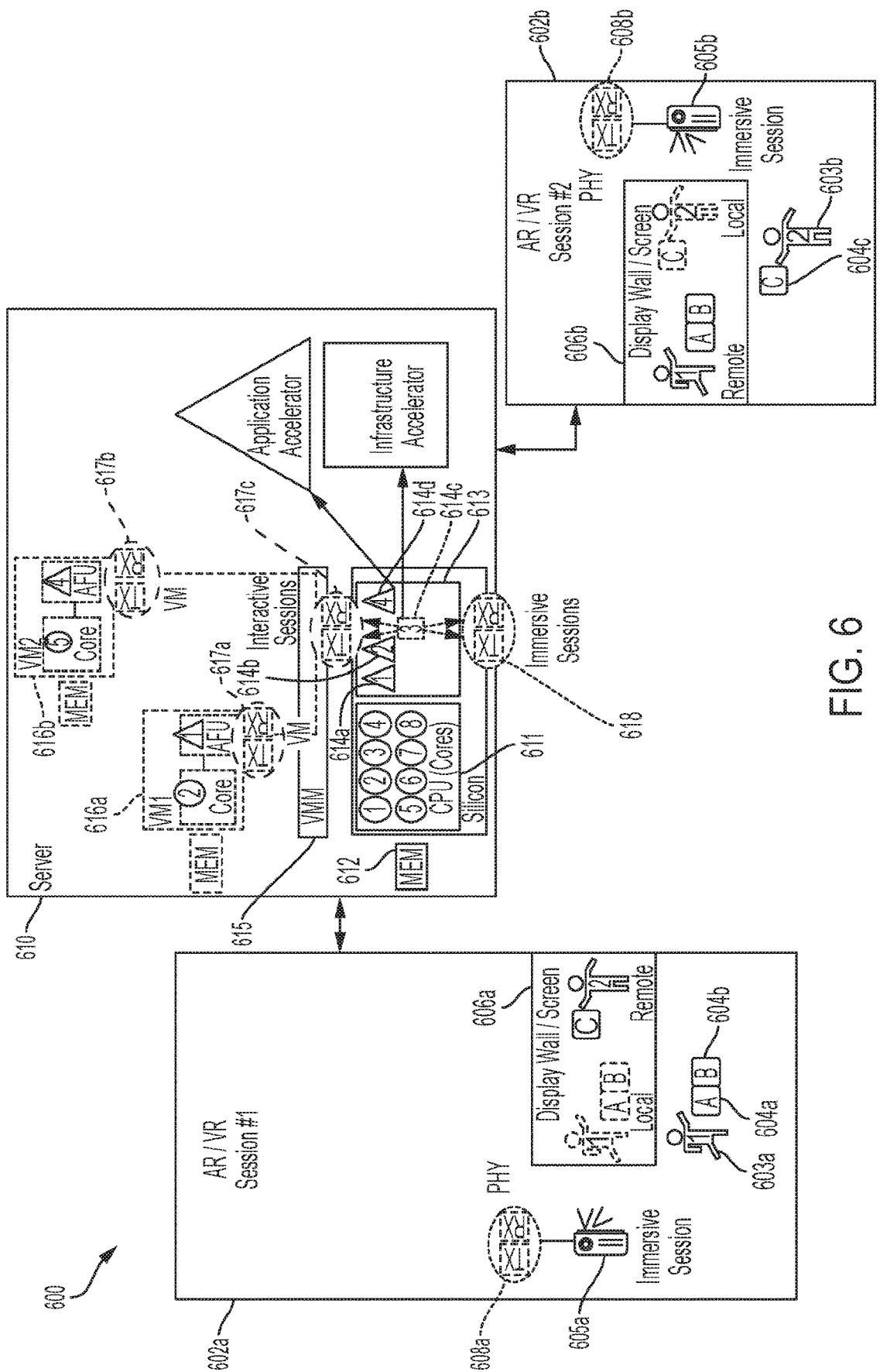
FIG. 6 illustrates an example computing environment for interactive and immersive reality sessions.

FIG. 6 illustrates an example computing environment 600 for interactive and immersive reality sessions. In the illustrated embodiment, computing environment 600 includes multiple immersive reality sessions 602*a-b* established through an immersive reality server platform 610. Each immersive reality session 602*a-b* includes a person 603*a-b*, one or more interactive objects 604*a-c*, projector 605*a-b*, display wall or screen 606*a-b*, and physical network interface 608*a,b* (e.g., transmit (TX) and receive (RX) ports). Further, server 610 includes CPU cores 611, memory 612, FPGA hardware accelerator circuit 613, accelerator function units (AFUs) 614*a-d* (e.g., hardware accelerators), virtual machine manager (VMM) 615, virtual machines 616*a-b*, virtual network interfaces 617*a-c* (e.g., virtual TX and RX ports), and physical network interface 618 (e.g., physical TX and RX ports).

In the illustrated example, multiple immersive reality sessions 602*a-b* are established between two people 603*a-b* in separate physical locations. Each person 603*a-b* has one or more interactive objects or controllers 604*a-c*, along with a projector 605*a-b* that displays immersive AR/VR content on a display wall or screen 606*a-b*. In other embodiments, any type of immersive reality display may be used to display the AR/VR content, such as a virtual reality headset, among other examples.

Moreover, the immersive reality sessions 602*a-b* are connected to each other through the immersive reality server 610, which enables the respective sessions to interact. For example, the server 610 manages each immersive session 602*a-b* using a separate virtual machine (VM) 616*a-b*, and further provides hardware-accelerated communication and resource sharing between the respective VMs 616*a-b*, thus enabling the immersive sessions 602*a-b* to interact with each other.

In the illustrated embodiment, for example, server 610 includes an FPGA hardware accelerator circuit 613, which includes a collection of accelerator function units (AFUs) 614*a-d* (e.g., hardware accelerators) that provide various types of hardware acceleration, including AR/VR workload and algorithm acceleration for applications, infrastructure acceleration for hardware-accelerated input/output (I/O), and so forth. For example, some of the AFUs 614 may be application accelerators (e.g., AFU 614*d*) that provide hardware acceleration of various algorithms used by applications for processing AR/VR workloads (e.g., immersive reality algorithms). Further, some of the AFUs 614 may be infrastructure accelerators (e.g., AFU 614*c*) that provide hardware-accelerated I/O for interactive and immersive sessions using a crossbar switch (e.g., to accelerate communication between the physical and virtual network interfaces, among the virtual network interfaces of different VMs, between the VMs and AFUs, among the various AFUs, and so forth). Further, server 610 extends the processor coherency domain to encompass CPU 611, memory 612, and FPGA accelerator 613, thus optimizing AR/VR responsiveness.

In the illustrated embodiment, for example, server 610 is implemented using a silicon device and associated system that provides a low-latency, high-bandwidth solution for multi-session interactive and immersive AR/VR sessions 602*a,b*. For example, the silicon device includes an associated crossbar system that enables multiple low-latency high-bandwidth AR/VR sessions to co-exist and communicate on the same server, while also providing them with coherently networked compute resources and programmable hardware acceleration, thus enabling immersive (local) sessions to become interactive (remote) sessions.

Further, the server 610 maintains a coherency domain that tightly couples the processor 611, system memory 612, FPGA accelerator circuit 613, and networking resources 618 to optimize AR/VR responsiveness. For example, server 610 includes an interconnect that enables the processor 611 and the accelerator circuit 613 to share access to a coherent memory space (e.g., using various underlying coherent and/or non-coherent physical links, interfaces, and protocols), which includes the main system memory 612, the cache of processor 611, and the cache of accelerator circuit 613. In this manner, the coherency domain may couple the multi-processor compute cache, system memory, FPGA cache, FPGA hardware acceleration units, networking resources, and so forth. In some embodiments, for example, the CPU and FPGA hardware acceleration are coherently coupled using crossbar switch acceleration and assisted with services provided by Intel® Resource Director Technology (RDT), including cache allocation and memory allocation capabilities. In this manner, non-blocking simultaneous switching operations allow local and remote immersive AR/VR sessions to interact while providing hardware-assisted compute for AR/VR workloads. In some embodiments, for example, the integrated processor 611 and accelerator circuit 613 could be implemented using the Intel® Xeon® Gold 6138P processor architecture.

As an example, with respect to an interactive kids space, the people 603*a-b* involved in the immersive reality sessions 602*a-b* may be kids in different locations, and the interactive objects or controllers 604*a-c* may be "smart toys" with embedded sensors and/or processors. While these kids can only physically interact with their own respective toys, they are able to virtually interact with each other and each other's toys via the interactive immersive reality sessions 602*a-b*. For example, a 1st kid may have physical access to smart toys A and B, while a 2nd kid may have physical access to smart toy C. Accordingly, the 1st kid can only physically interact with smart toys A and B, and the 2nd kid can only physically interact with smart toy C. However, via the interactive and immersive sessions 602*a-b*, the 1st kid can virtually interact with the 2nd kid and with smart toy C, and the 2nd kid can virtually interact with the 1st kid and with smart toys A and B.

Figure 7A:
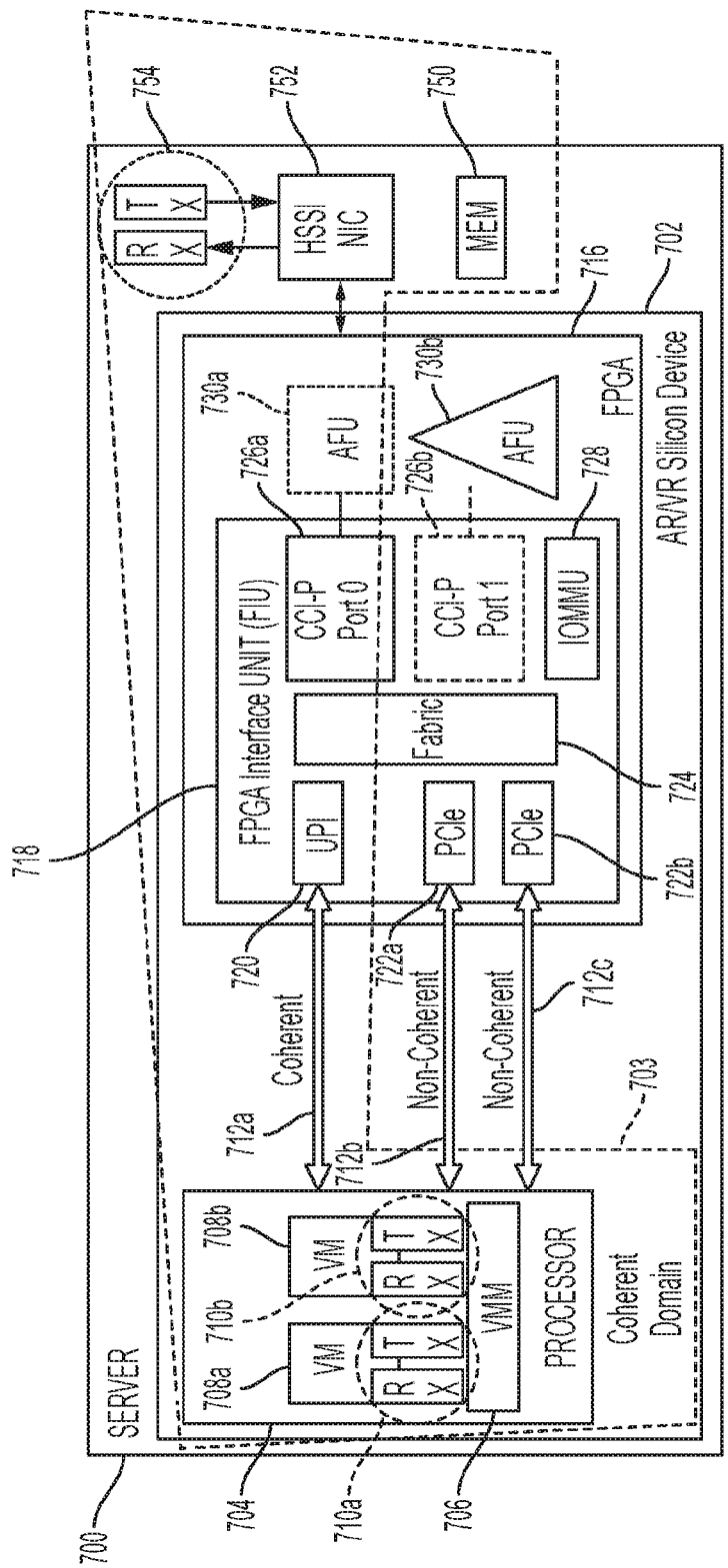
FIGS. 7A-D illustrate an example embodiment of an immersive reality server platform.

FIGS. 7A-D illustrate an example embodiment of an immersive reality server platform 700. FIG. 7A illustrates the server 700 itself. In the illustrated embodiment, the server 700 includes a custom immersive reality (e.g., AR/VR) silicon device 702, memory 750, a network interface card (NIC) 752, and a physical network interface 754 (e.g., physical transmit (TX) and receive (RX) ports).

The immersive reality (e.g., AR/VR) silicon device 702 is a silicon chip package that includes a processor 704 coupled to an FPGA hardware accelerator circuit 716 via a collection of coherent and non-coherent links 712*a-c*.

A virtual machine manager (VMM) 706, along with multiple virtual machines (VMs) 708*a-b*, are executing on the processor 704, and each VM 708*a-b* has an associated virtual network interface 710*a-b* (e.g., virtual transmit (TX) and receive (RX) ports).

FPGA hardware accelerator circuit 716 includes an FPGA interface unit (FIU) 718 and a collection of accelerator function units (AFUs) 730*a-b* (e.g., hardware accelerators). The FPGA interface unit (FIU) 718 includes a coherent interface 720 (e.g., an Intel® UltraPath Interconnect (UPI) interface), non-coherent interfaces 722*a-b* (e.g., Peripheral Component Interconnect express (PCIe) interfaces), a virtual channel fabric 724, programmable core cache interface (CCI-P) ports 726*a-b*, and an input-output memory management unit (IOMMU) 728.

While FPGA hardware accelerator 716 is implemented using a field-programmable gate array (FPGA) in the illustrated embodiment, any type of hardware circuitry and/or logic can be used to implement the functionality of hardware accelerator 716, including FPGAs, application-specific integrated circuits (ASICs), and/or any other type or combination of programmable or fixed-function integrated circuits or processing devices. Moreover, in some embodiments, multiple hardware accelerator circuits 716 may be implemented on the silicon device 702 (e.g., a combination of both FPGA and ASIC accelerators). In some embodiments, for example, hardware accelerator 716 could be implemented using specialized ASIC accelerator capabilities available in Intel® Xeon Scalable Platforms, including Intel® QuickAssist Technology for security and compression acceleration.

As explained further below, the AR/VR silicon device 702 provides hardware-accelerated communication and networking infrastructure, algorithms, and resource sharing within an extended coherency domain that encompasses processor 704, memory 750, and FPGA accelerator 716, thus optimizing AR/VR responsiveness.

Figure 7B:
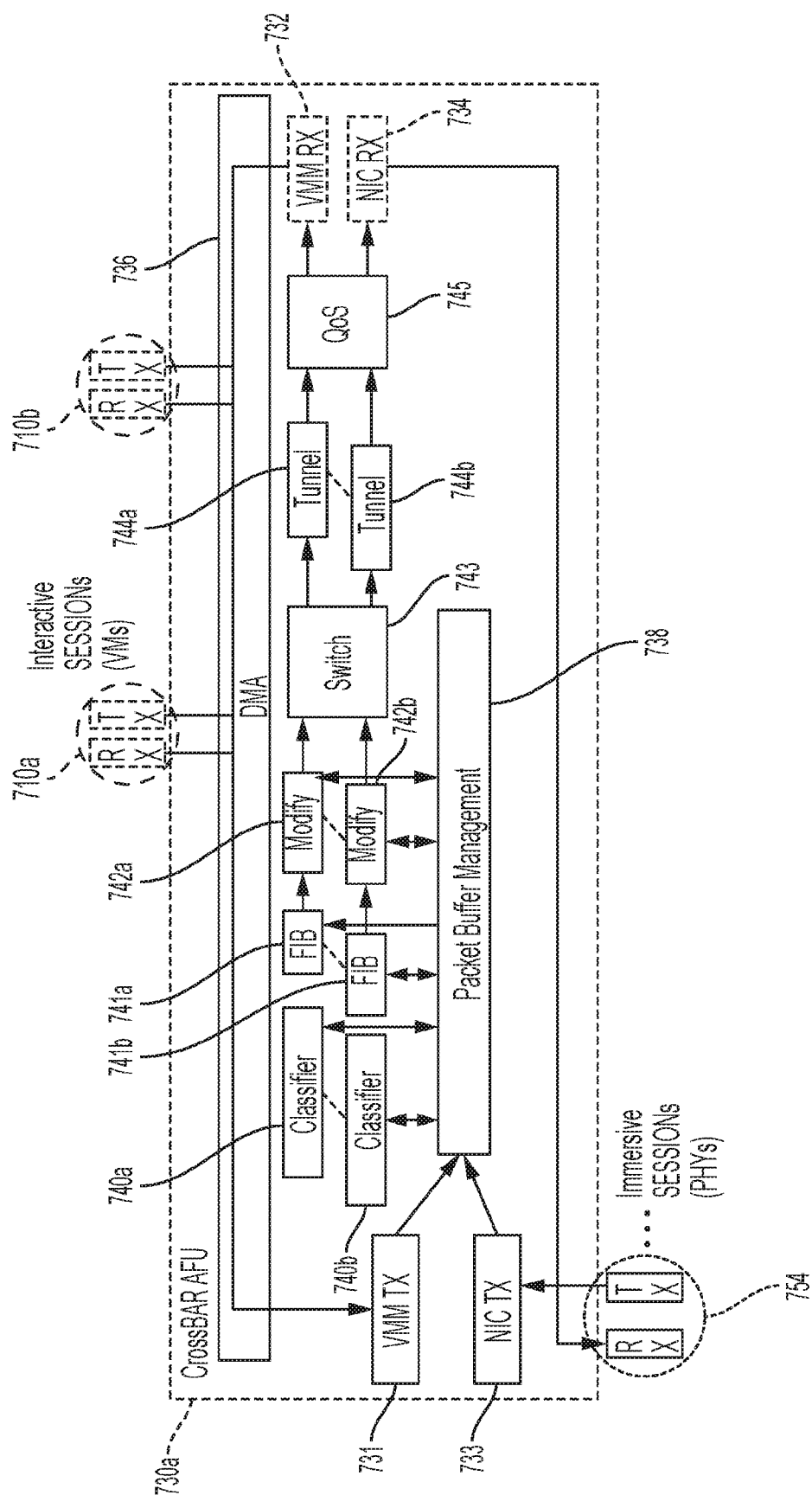

FIG. 7B illustrates the crossbar infrastructure AFU 730*a* of server 700. The crossbar infrastructure AFU 730*a* is used to simultaneously combine immersive and interactive sessions, as described below.

For example, the virtual transmit (TX) and receive (RX) ports 710 (or "virtIO" network ports) of a VM 708 provisioned for a particular interactive session are bound to a particular hardware accelerator function unit (AFU) 730 used for infrastructure acceleration, such as crossbar infrastructure AFU 730*a*. The crossbar infrastructure AFU 730*a* implements a crossbar switching mechanism that includes a direct memory access (DMA) controller core 736 and various queue handlers 731-734 (e.g., VMM transmit (TX) queue handler 731, VMM receive (RX) queue handler 732, NIC transmit (TX) queue handler 733, and NIC receive (RX) queue handler 734).

The DMA core 736 is responsible for receiving and transmitting data to/from the virtIO queues 710 of interactive VM sessions 708. The virtIO DMA 736 connects to the crossbar fast path packet processing pipelines, which includes various packet processing functions, including packet buffer management 738, classifiers 740*a-b*, forwarding information bases (FIBs) 741*a-b*, modify 742*a-b*, switch 743, tunnel 744*a-b*, and quality of service (QOS) 745. The content of the packet buffer 738 is transparent to the virtIO DMA.

The incoming packet order received from the virtIO TX queue 710 remains unchanged after passing through the virtIO TX queue handler 731. Similarly, the outgoing packet order for the virtIO RX queue 710 is the same order as when the virtIO RX queue handler 732 received the packets.

The TX queue handler 731 has several internal modules working together to access the virtIO TX queue 710 and fetch the packet data to internal packet buffers 738.

The virtIO DMA 736 supports cache line aligned read and write operations. For read operations, the TX handler will fetch the whole cache line data and parse the required data. For write operations, a local copy of memory is preserved and merged with the fields that require updating, thus preventing other fields from being overwritten while also avoiding extra read operations. Further, resource director technology (RDT) is leveraged to provide visibility and control over how shared server resources (e.g., last-level cache (LLC) and memory bandwidth) are used by applications, virtual machines (VMs), containers, and so forth.

The RX queue handler 732 has several internal modules working together to access the virtIO RX queue 710 and store the packet data to the virtIO queue from internal packet buffers 738.

The VirtIO DMA 736 can also be used as a generic virtual interface for VMs 708 to offload AR/VR workloads to the AFUs (e.g., AFU 730*b*) that can provide the appropriate algorithm acceleration for those workloads. Data in the packet buffers is used as the input data. The output is the result of the acceleration logic that processes the data within a particular algorithm accelerator AFU 730.

Figure 7C:
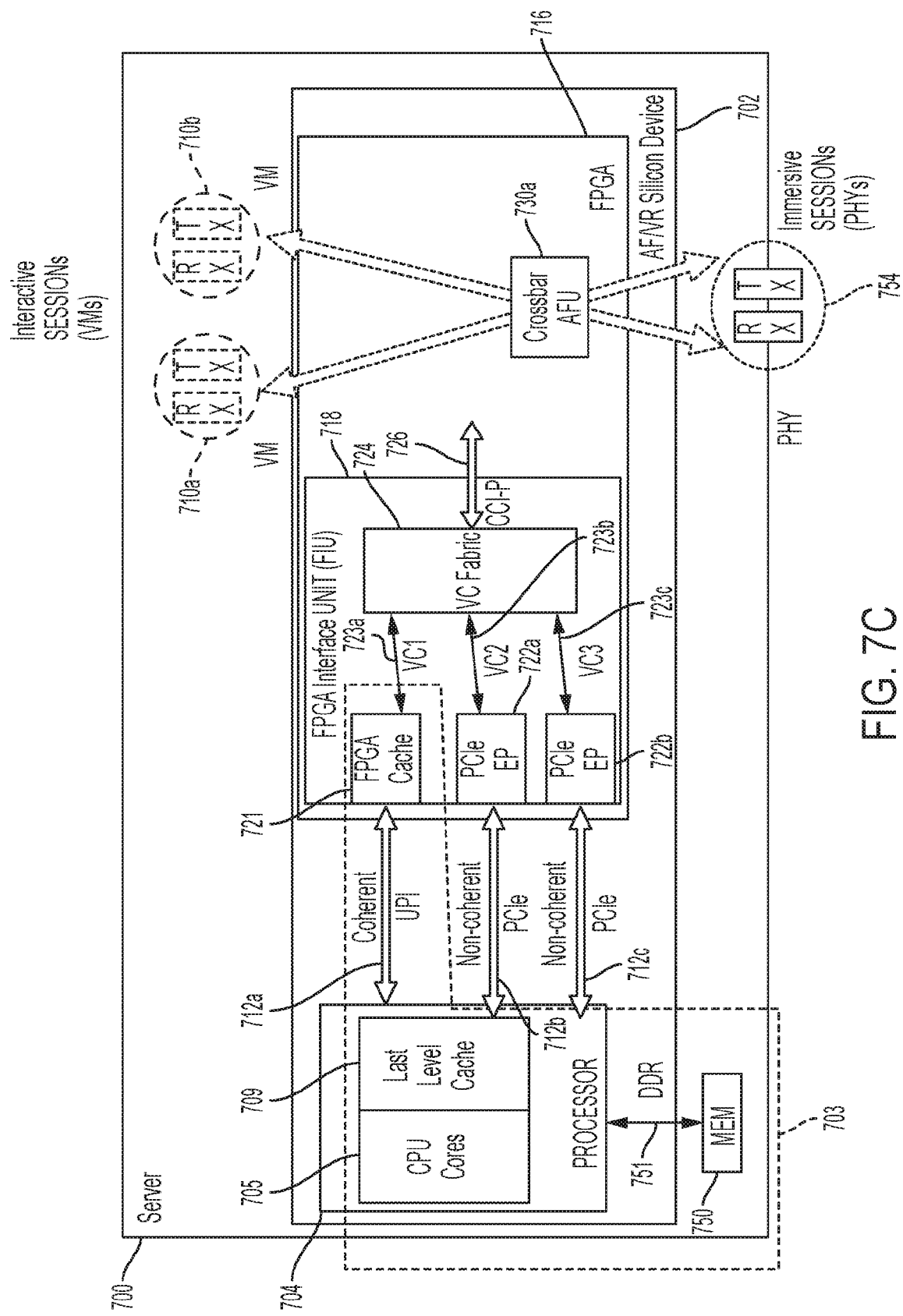
Figure 7D:
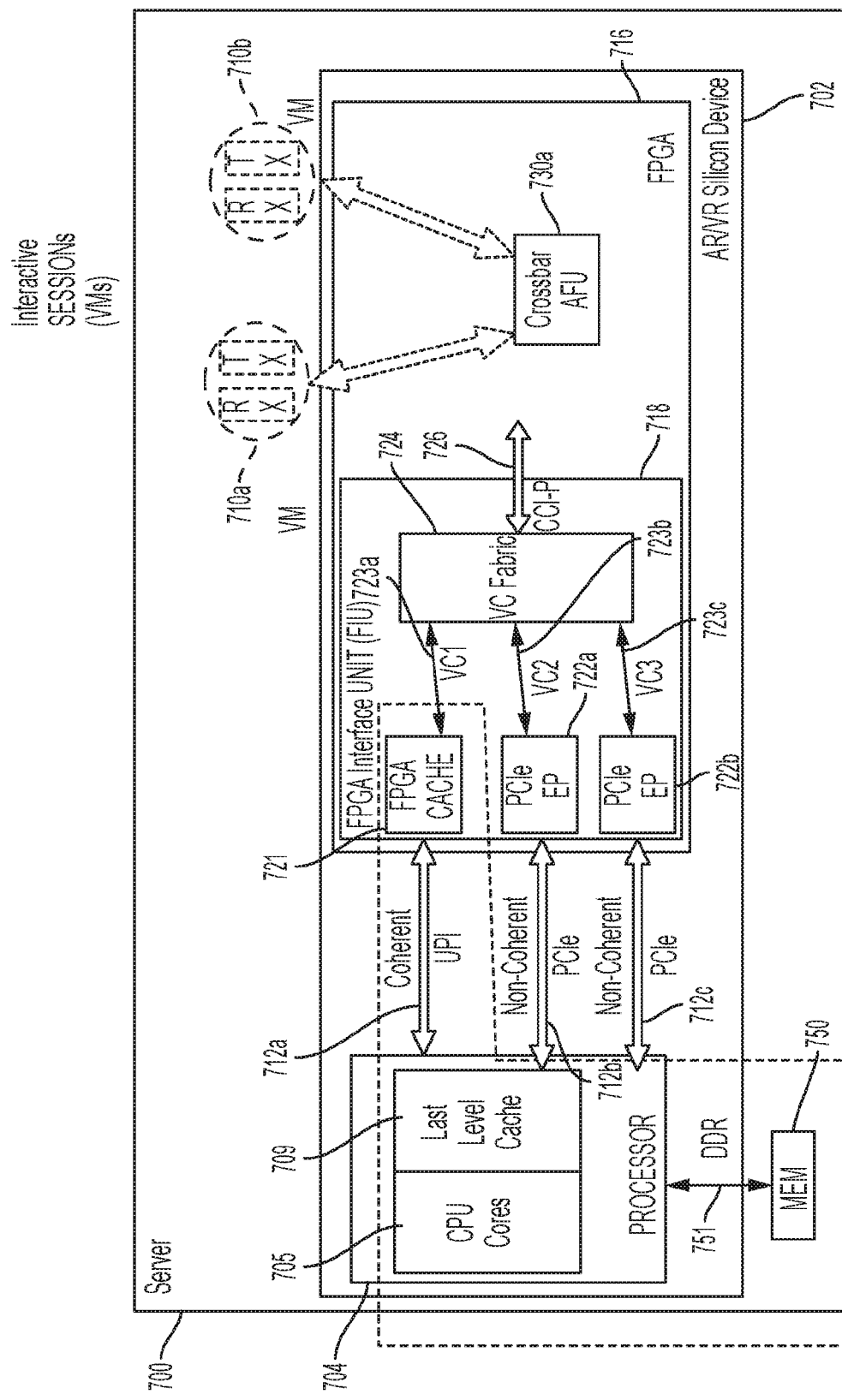

FIG. 7C illustrates how the crossbar infrastructure AFU 730*a* of server 700 is used for communication between immersive (PHY) and interactive (VM) sessions, while FIG. 7D illustrates how the crossbar infrastructure AFU 730*a* of server 700 is used for communication between interactive (VM) to interactive (VM) sessions.

In the embodiment of server 700 illustrated by FIGS. 7A-D, the processor coherency domain 703 is extended to encompass the FPGA accelerator 716 in order to optimize real-time responsiveness. For example, the extended processor coherency domain 703 tightly couples the multi-processor cache(s) (e.g., last level cache (LLC) 709 of CPU cores 705), system memory 750 (e.g., via double data rate (DDR) memory bus 751), FPGA cache 721, FPGA accelerator 716 and associated AFUs 730, and resource sharing technologies (e.g., resource director technologies (RDT)).

For example, the server 700 assigns virtual channels (VCs) 723*a-c* to AFUs 730 for individual workloads based on various operational characteristics and parameters, such as caching hints, data payload side, and interconnect link utilization. Full-packet frames are transferred from the CPU VMs 708*a-b* and directly between the AFUs 730 so that multiple switching actions can happen simultaneously among the immersive reality sessions.

AR/VR workloads that are compute intensive are optimized with the use of FPGA hardware acceleration 716 (e.g., via algorithm acceleration AFUs 730) together with optimum links 712*a-c* between the FPGA 716, CPU 704, and system memory 750.

For example, links 712 between the CPU 704, FPGA accelerator 716, and memory 750 are selectively leveraged for quick and efficient data transfers to accommodate multiple AR/VR workloads (e.g., classify, forward, modify, tunnel, QoS) based on various operational characteristics (e.g., data payloads, latencies).

Some AR/VR workloads perform best with low latency data transfers among CPU 704, FPGA 716, and memory 750, while some workloads perform best with cache and memory coherency among CPU 704, FPGA 716, and memory 750.

The processor 704, FPGA accelerator 716, and links 714 are implemented as a multichip package (MCP) on a silicon device 702. For example, on the silicon device 702, the CPU 704 and FPGA accelerator 716 are coupled together via a collection of coherent (UPI) and non-coherent (PCIe) physical interconnects 714*a-c*.

The FPGA accelerator 716 has two logic regions, which include an FPGA interface unit (FIU) 718 and a collection of accelerator function units (AFUs) 730. The FIU 718 includes system and platform code that is configured at boot time and remains in memory to manage the system buses. The AFUs 730 are accelerators that provide various types of hardware acceleration, which can be programmable and may be updated any time after booting.

The interface between the AFUs 730 and the FIU 718 is a programmable core cache interface (CCI-P) 726, which is a hardware-side signaling interface. CCI-P provides a layer of abstraction over the physical links 712*a-c* between the FPGA 716 and the CPU 704 on the MCP silicon device 702. For example, the CCI-P interface 726 abstracts the physical coherent (UPI) and non-coherent (PCIe) interconnects 712*a-c* coupled to the processor 704. The CCI-P interface 726 also provides simple load and store semantics to the AFUs 730 for accessing system memory 750. Further, CCI-P supports data payloads that can accommodate multiple cache lines.

The CCI-P interface 726 provides access to two types of memory: a main memory and an input/output (I/O) memory. The main memory is the memory 750 attached to the processor 704, which is exposed to the operating system and is directly accessible from the AFUs 730. The I/O memory is an I/O memory management unit (IOMMU) 728. The I/O memory requests originate from the AFUs 730 using memory management I/O (MMIO), as defined by the CCI-P interface 726.

The AFUs 730 access a unified interface with multiple virtual channels (VCs) 723*a-c* and a unified memory address space (UAS). The unified address space (UAS) is coupled to the physical coherent (UPI) and non-coherent (PCIe) interconnects 712*a-c*. In this manner, the AFUs 730 maintain a single view of the system address space. For example, a write to address X goes to the same cache line in system memory 750 regardless of whether it travels across the coherent (UPI) and/or non-coherent (PCIe) physical interconnects 712*a-c*.

The FPGA interface unit (FIU) 718 is coupled to the CPU 704 of the silicon multichip package (MCP) 702 via the physical coherent (UPI) and non-coherent (PCIe) interconnects 712*a-c*. The FIU 718 implements the interface protocols and manageability for the links 712*a-c* between the CPU 704 and FPGA accelerator 716. The FIU 718 also provides various platform capabilities, such as virtual technology (VT) for directed I/O (VT-d), security, error monitoring, performance monitoring, power and thermal management, partial reconfiguration of the AFUs 730, and so forth.

The FIU 718 extends the coherence domain 703 from the processor 704 to the FPGA accelerator 718, thus creating a coherence domain (CD) 703 that includes the FPGA accelerator cache 721, CPU cache 709, and system memory 750.

The FIU 718 implements a cache controller and a coherent (UPI) caching agent (CA). The caching agent makes read and write requests to the coherent system memory 750 and also services snoop requests to the FPGA cache 721.

The physical coherent (UPI) and non-coherent (PCIe) interconnects 712*a-c* are multiplexed as a set of virtual channels (VCs) 723*a-c*, which are connected to a VC steering fabric 724. Any virtual channel 723*a-c* (coherent or non-coherent) can be selected for each acceleration request associated with the AFUs 730.

Further, in some embodiments, a virtual automatic channel (VAC) is used to combine acceleration requests using all physical buses in order to optimize bandwidth. The VAC channel is optimized for maximum workload bandwidth, and the VC steering fabric 724 determines which physical interconnects 712*a-c* to use based on certain VAC criteria.

In various embodiments, for example, the VAC criteria may include a caching hint, data payload size, and link utilization. For example, cacheable requests identified with cache hints will be biased towards the coherent (UPI) link 712*a*. Moreover, requests with a data payload size equal to the size of a cache line will also be biased towards the coherent (UPI) link 712*a*. For example, for 64-byte (64B) cache lines, requests with a data payload size of 64 bytes will be biased towards the coherent (UPI) link 712*a*. In some embodiments, a multi-cache line read or write will not be split between multiple virtual channels (VCs) 723*a-c* in order to guarantee that it will be processed by a single physical link 712. Further, link utilization is used to balance the load across all the coherent and non-coherent virtual channels 723*a-c*.

Each AFU 730 includes a set of accelerated workloads, and each individual workload is coupled to a virtual channel 723*a-c* to provide optimum performance for that particular workload. For example, the AFUs 730 may include a combination of algorithm accelerators and crossbar infrastructure accelerators. The algorithm accelerator AFUs provide hardware acceleration of algorithms that are commonly used to process certain AR/VR workloads. The crossbar infrastructure AFUs (e.g., AFU 730*a*) implement the AR/VR acceleration that transports data packets back and forth between virtIO queues (RX/TX) and the AR/VR logic.

In some embodiments, for example, a crossbar infrastructure AFU (e.g., AFU 730*a*) includes the following workloads: a DMA workload 736, a virtIO TX/RX workload 731-734, a classifier workload 740, a forwarding information base (FIB) lookup workflow 741, a modify workload 742, a switch workload 743, a tunnel workload 744, and a QoS workload 745.

For example, a crossbar AFU (e.g., AFU 730*a*) may provide a configuration interface for software to specify the address of the virtIO queues and mapping tables for memory regions containing packet buffers. A crossbar AFU also couples the CCI-P interface 726 to a high-performance DMA engine 736, and further couples the virtIO queues in order to access and parse virtIO queue (TX/RX) data structures in main system memory, retrieve packet buffers from system memory, and transmit packet buffers to system memory. Finally, a crossbar AFU may provide a hardware interface to other AFUs 730, such as algorithm accelerator AFUs that are handling other AR/VR workloads (e.g., rendering, artificial intelligence, machine learning, computer vision), so that each workload can interface and handle related packets.

Figure 8A:
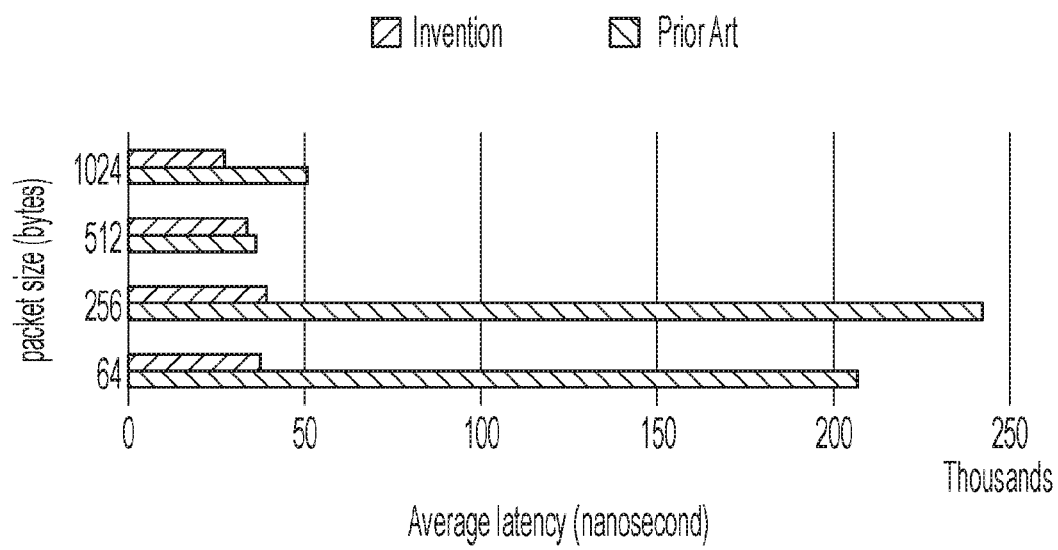
FIGS. 8A-B illustrate performance graphs of the average latency for various packet sizes using different immersive reality solutions.
Figure 8B:
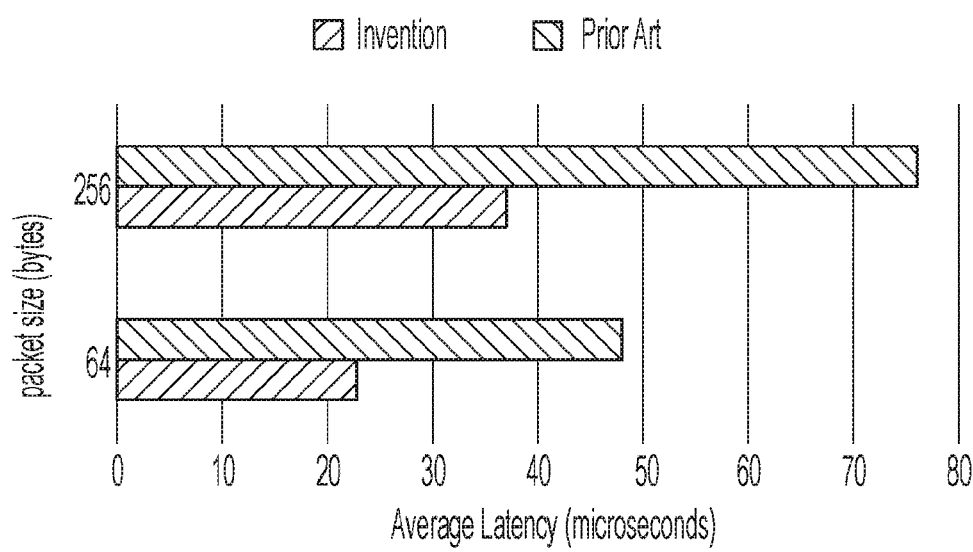

FIGS. 8A-B illustrate performance graphs of the average latency for various packet sizes using the described solution versus an existing software-based solution. In particular, FIG. 8A illustrates a performance graph of the average latency for immersive to interactive (PHY-VM) sessions (e.g., as illustrated in FIG. 7C), while FIG. 8B illustrates a performance graph of the average latency for interactive to interactive (VM-VM) sessions (e.g., as illustrated in FIG. 7D). As shown by these figures, the described solution provides better latency than the existing solution for both immersive to interactive (PHY-VM) sessions and interactive to interactive (VM-VM) sessions.

With respect to a 64-byte packet (smallest and worst case) processed in four cycles, assuming 512-bit inbound data and 512-bit outbound data for the forwarding information base (FIB) and 200 MHz frequency, the output (match fields add up to 162 bytes) will also be sent out in four cycles. There will be three idle cycles during the input for every four-cycle window, while output will be sent without a bubble in the best throughput case. Based on the processing calculation above: overall throughput=64 bytes/(4 cycles)=64B/(4×5 ns)=3.2 GB/s (raw bandwidth with one packet in every four cycles at classifier input). In the best case scenario, where packet data and metadata are both 64 bytes only (e.g., taking one cycle only), packets may be coming and going out of the FIB every cycle, and thus the best case throughput is as follows: 64B/cycle=64B/5 ns=12.8 GB/s=102.4 Gbps (where the IP design is running at 200 MHz).

Figure 9A:
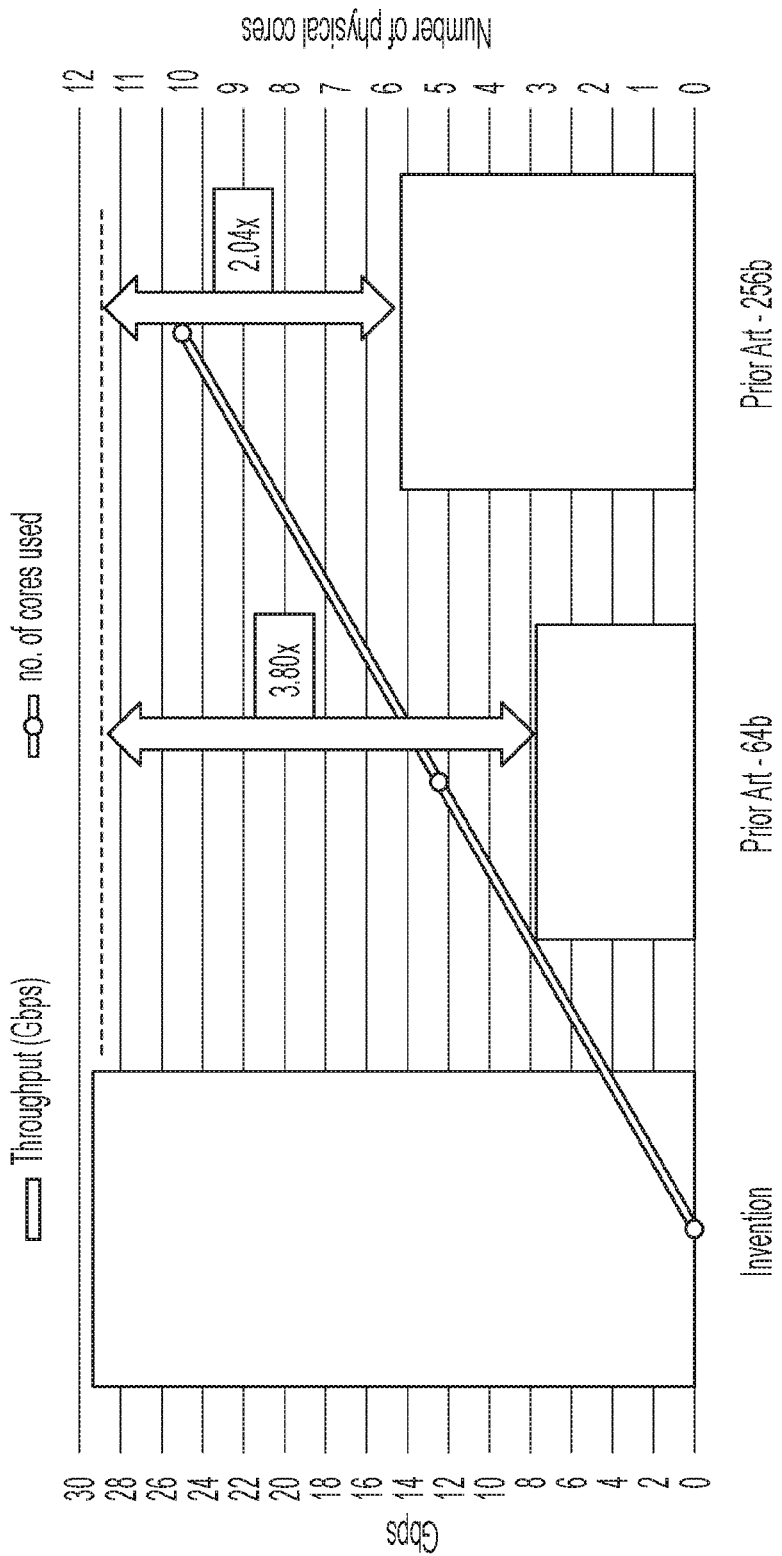
FIGS. 9A-B illustrate performance graphs of core and port throughput using different immersive reality solutions.
Figure 9B:
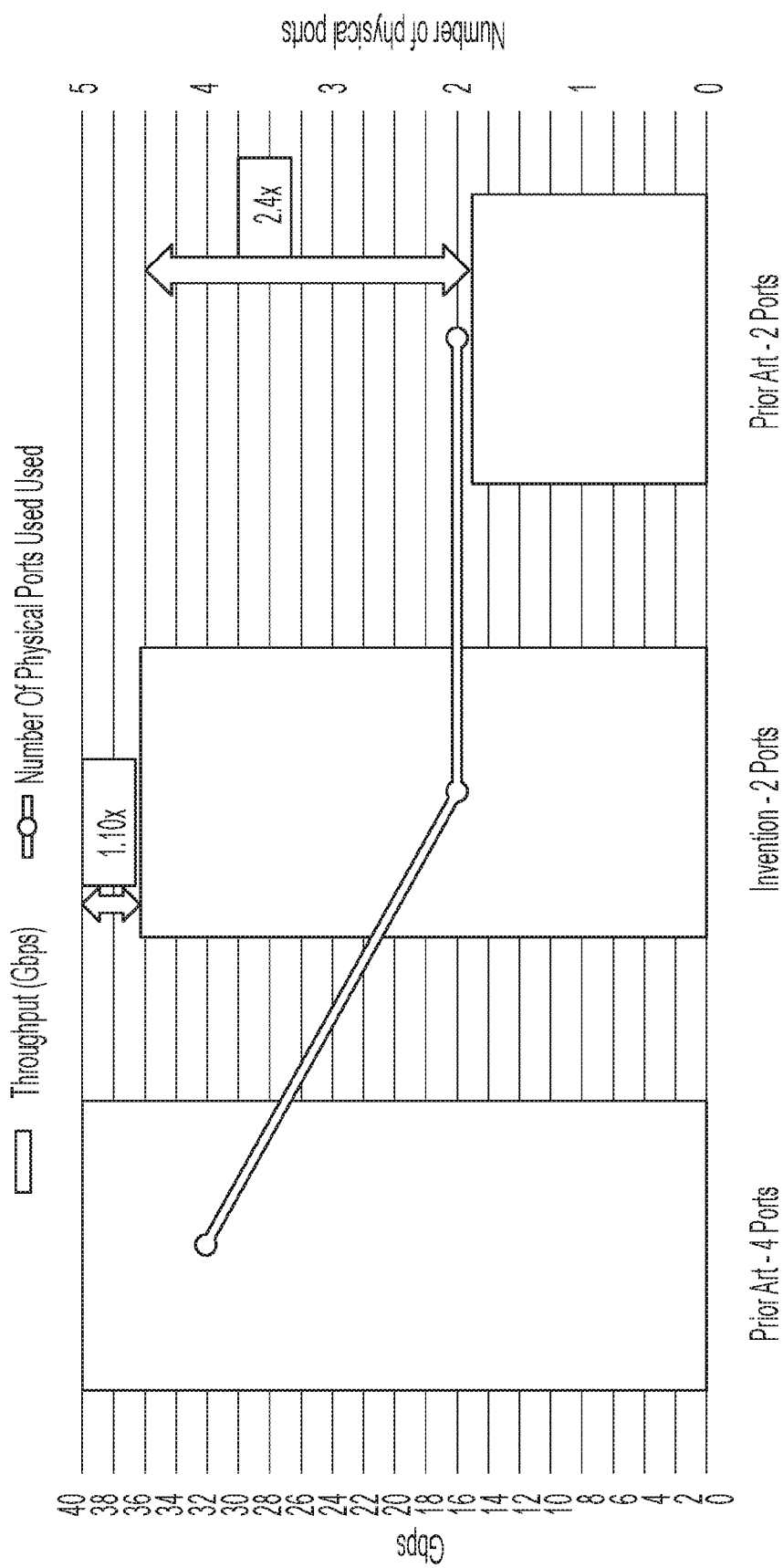

FIGS. 9A-B illustrate performance graphs of core and port throughput using the described solution versus existing software-based solutions. In particular, FIG. 9A illustrates a performance graph of core usage and throughput, while FIG. 9B illustrates a performance graph of port usage and throughput.

Figure 10:
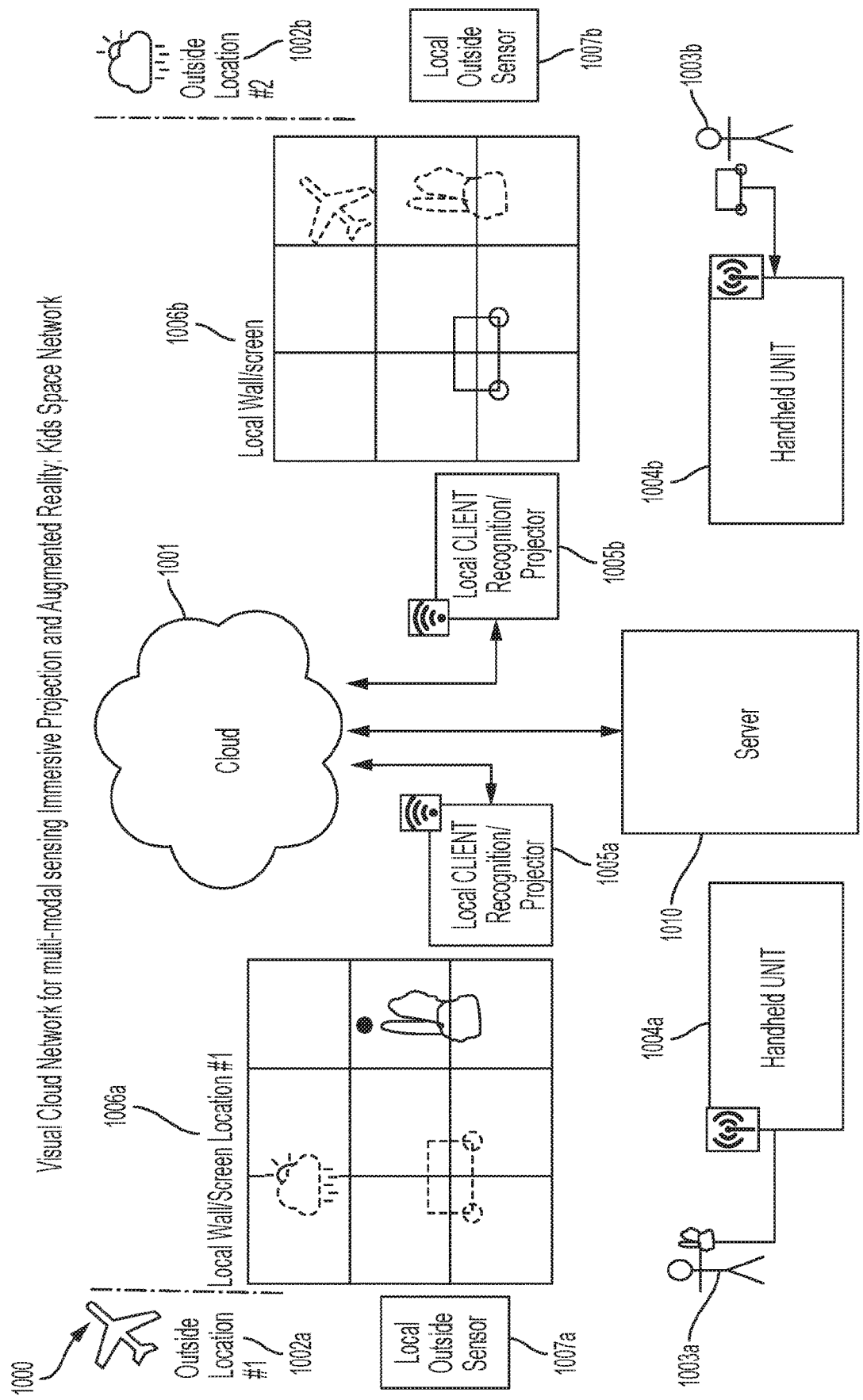
FIG. 10 illustrates an example embodiment of an immersive and interactive kids space system.

FIG. 10 illustrates an example embodiment of an immersive and interactive kids space system 1000 implemented using the immersive reality platform described throughout this disclosure. In the illustrated embodiment, kids space system 1000 includes multiple immersive reality sessions 1002*a-b* established between two kids 1003*a-b* in separate physical locations. Each kid 1003*a-b* has an associated handheld unit 1004*a-b*, local client device 1005*a-b*, and local outside sensor(s) 1007*a-b*. The handheld unit 1004*a-b* may be a handheld controller or other device (e.g., a smart toy or other smart object) with an embedded processor or control unit, battery, sensors (e.g., proximity sensors and/or other feedback mechanisms), communication interface(s) (e.g., for wireless I/O), and so forth. The local client 1005*a-b* may be any type of computing device capable of processing and/or displaying AR/VR content, such as a computer with recognition/sensing, rendering, and/or projection capabilities. The AR/VR content rendered by the local client 1005*a-b* may be displayed on the local display wall or screen 1006*a-b*, which may be a projection screen, a virtual reality headset, and/or any other type of AR/VR display device. In various embodiments, the local client 1005*a-b* and local display mechanism 1006*a-b* may be separate devices or a single integrated device. Further, one or more local outside sensor(s) 1007*a-b* may be used to detect physical and/or environmental conditions (e.g., weather) in the physical location of a particular session (e.g., enabling those conditions to be virtually replicated in other remote immersive reality sessions).

Moreover, the local clients 1005*a-b* associated with the respective immersive reality sessions 1002*a-b* are connected to a kids space server 1010 via the cloud 1001, which enables the respective sessions to interact. In some embodiments, for example, the kids space server 1010 may be implemented using the immersive reality server platform described throughout this disclosure (e.g., server platform 700 of FIGS. 7A-D), which provides hardware-accelerated communication and networking infrastructure, algorithms, and resource sharing within an extended coherency domain in order to optimize AR/VR responsiveness.

The kids space system 1000 combines visual, audio, and other sensor data to make sense of both the physical environment and the actions, gestures, and emotions of people in that environment. This sense-making, when accompanied by natural language processing and projection mapping, can create interactive digital content that gives the impression of "being there" in the room with human occupants. These technologies can be leveraged to deliver a new kind of play and learning experience for young children.

For example, the kids space system 1000 combines physical humans (children) interacting with a physical responsive object or character (e.g., a squirrel toy with haptics) together with a virtual user (e.g., a remote child) with their own physical responsive object or character (e.g., an acorn toy with audio) to form an interactive AR/VR learning environment. In the illustrated embodiment, the kids space system 1000 leverages immersive projection in a manner that is responsive to the physical environment. Remote virtual agents are projected in a way that makes them appear physically present in the room (e.g., responsive to the physical environment and activities of children) to enhance children's sense of engagement and interaction.

Multi-user interactive and immersive AR/VR sessions are very demanding. Extra computing overhead is involved in coordinating interactions among multiple AR/VR sessions. Virtualization overhead can often consume most of the available CPU cores. Guaranteed QoS, low jitter, low latency, and tightly coupled hardware-assisted compute resources are also essential. The goal of multi-user immersive and interactive sessions is to make local physical environmental conditions in a remote location appear physically present in another location to enhance children's sense of engagement with the remote participant, all in near real-time. Furthermore, interaction with an animated character makes heavy use of projection that is responsive to the physical environment.

In the illustrated example, a physical weather condition in one location (e.g., rain, snow, or hail) is incorporated into another augmented virtual location. Similarly, a plane flying overhead in one location is incorporated into the other augmented virtual location. Any type of dynamic physical or environmental characteristics can be shared between physical and virtual locations in a similar manner. Further, unique feedback mechanisms can be incorporated based on the proximity of local physical features (e.g., animated characters) to projected virtual features (e.g., weather conditions) in order to enhance the interactive learning experience. For example, a range of unique haptic responses and/or temperature responses may occur when the child moves a character into the proximity of the projected weather condition.

The near-real time remote sensing of physical events that are rendered and then projected in a remote location, and the subsequent local feedback of the physical object's proximity to the projected condition, are supported by the computing architecture described throughout this disclosure. Real-time F sensing, rendering, and subsequent transmission is handled in a multi-tenant secure virtual machine supported by hardware acceleration (e.g., on a datacenter server). The local rendering, projection, animated character proximity tracking, and broadcast of telemetry information is handled with the local client (e.g., a personal computer or other immersive reality computing device). Furthermore, the physical character may contain an ultrasonic transmitter, receiver, battery, and feedback mechanisms (e.g., haptic, light LEDs, hot and cold temperature devices) supported by a low-power processing and control unit.

Figure 11:
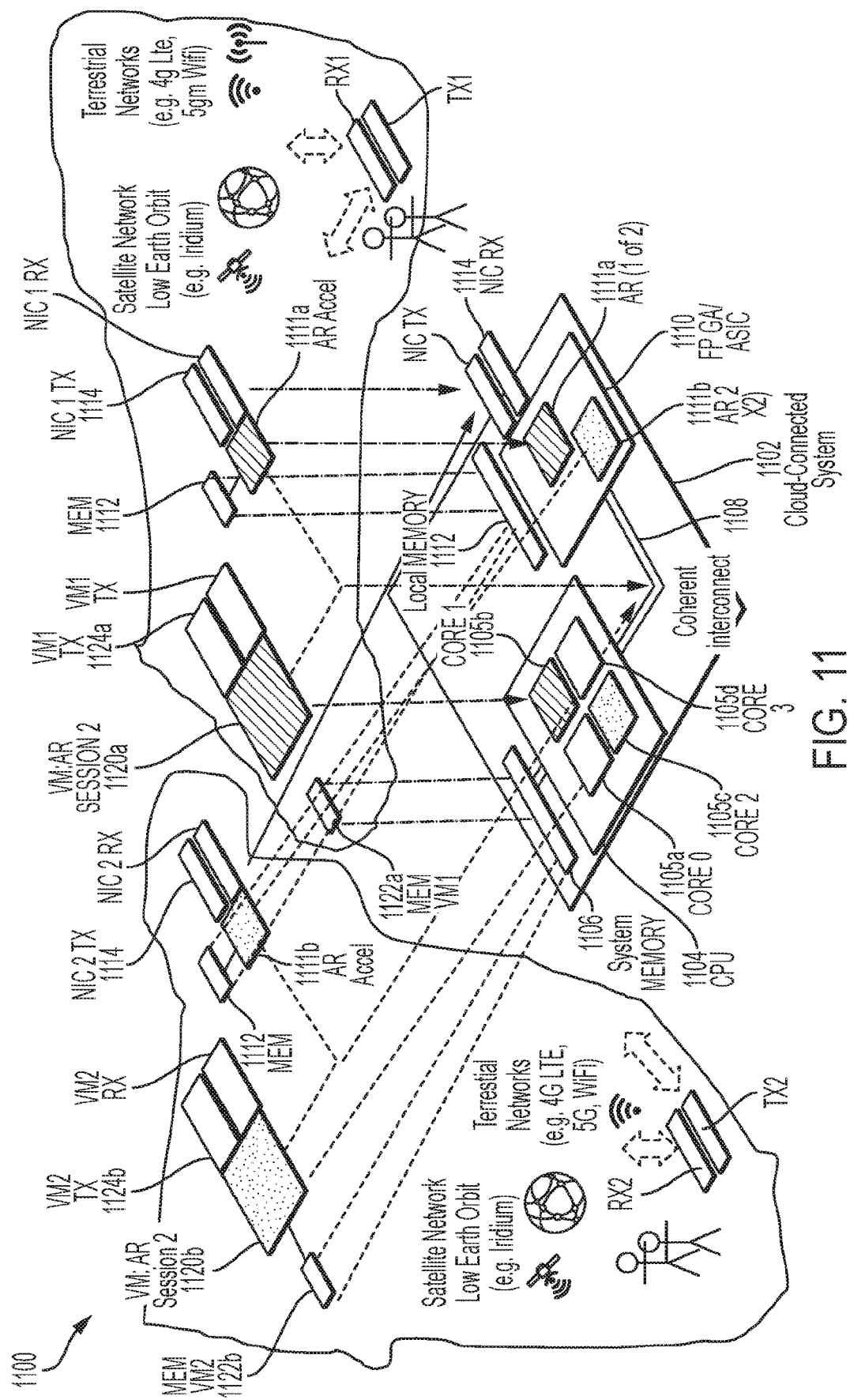
FIG. 11 illustrates an example resource mapping for kids space sessions on an immersive reality server.

FIG. 11 illustrates an example resource mapping 1100 for kids space sessions on an immersive reality server. In particular, resource mapping 1100 demonstrates how the resources required for interactive and immersive kids space sessions may be mapped onto immersive reality server 1102, which may be similar to the immersive reality server platform described throughout this disclosure (e.g., server 700 of FIGS. 7A-D).

In the illustrated example, the mapping is as follows:
1. The virtual machines (VMs) 1120a-b associated with each session are mapped onto different cores 1105a-d of processor 1104.
2. The virtual memory 1122a-b for each VM 1120a-b are mapped onto the system memory 1106 of server 1102.
3. The virtual transmit (TX) and receive (RX) ports 1124a-b of each VM 1120a-b are mapped onto the physical transmit (TX) and receive (RX) ports 1114 of server 1102.
4. Certain AR/VR workload(s) of each VM 1120a-b are mapped onto different accelerator function units (AFUs) 1111a-b of accelerator circuit 1110 (e.g., using the local memory 1112 of the accelerator circuit 1110 for data storage associated with those workloads).

FIGS. 12A-D illustrate example use cases associated with an interactive and immersive kids space, which may be implemented using the immersive reality system and platform described throughout this disclosure.

In some cases, for example, a kids space session may include a virtual meet and greet (not shown), which may involve interactions that allow the system to identify the participants in the kids space. The meet and greet may typically occur at the beginning of sessions when participants engage with the system, although participants may also be identified and/or re-identified during the flow of learning activities.

Figure 12A:
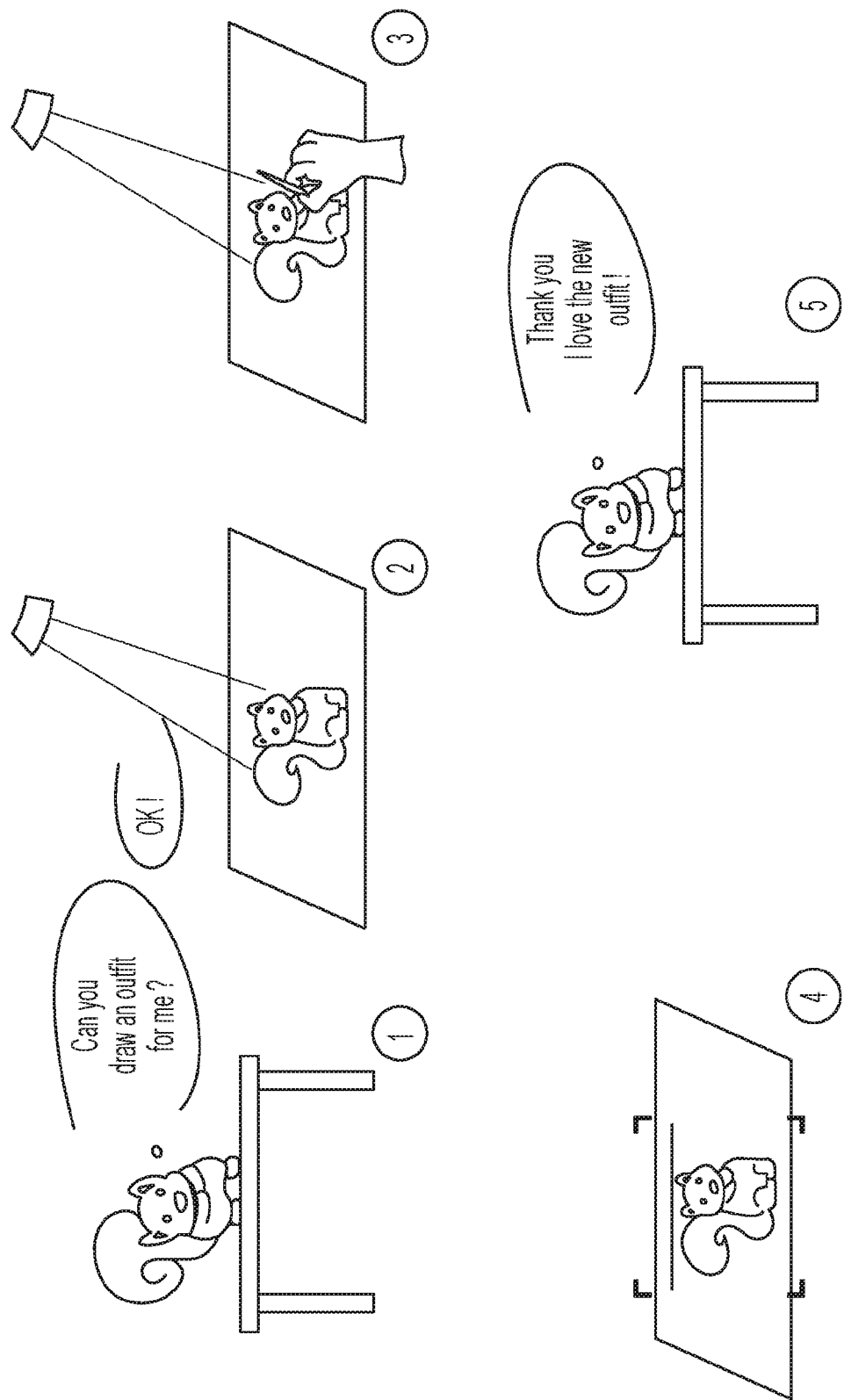
FIGS. 12A-D illustrate example use cases associated with an immersive kids space.

FIG. 12A illustrates an example of character customization. For example, children may be able to color in outlines of their associated characters, which can be scanned in and automatically applied as "skins" to virtual characters that are projected into the room.

Figure 12B:
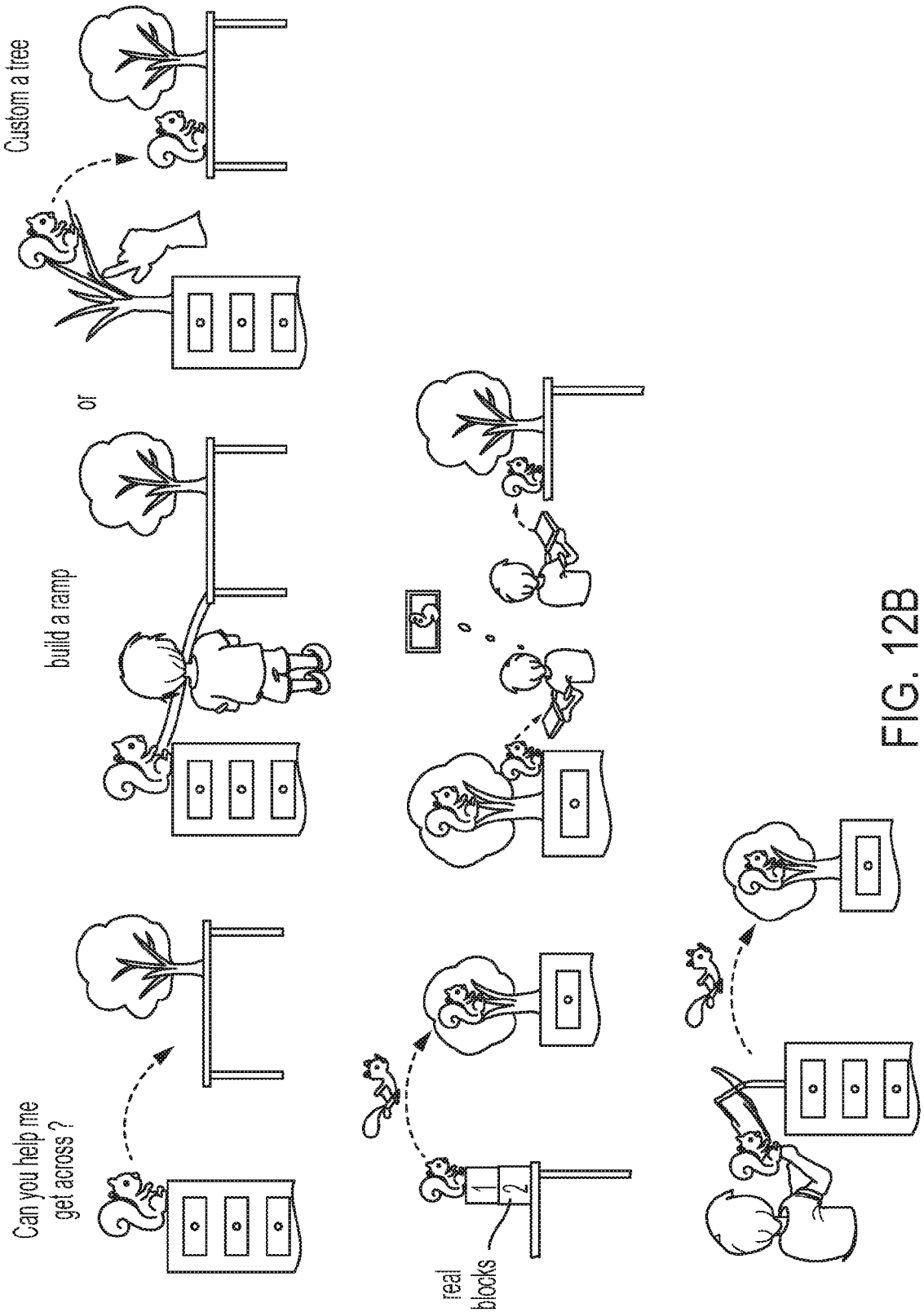

FIG. 12B illustrates an example of character traversal. For example, the system may present challenges to a child to help their character get from one spot to another around the room to achieve a goal. For example, the child may choose a spot to put a virtual apple, then use math, logic, and physics to solve traversal challenges, such as jumping from a bookshelf to a desk. Further, multiple modalities of traversal may be supported, such as detection of blocks and bridges against the wall, touch inputs to customize a tree, recognition of a tray (known to the system) to carry the projected squirrel, slingshot gestures to launch the character, and so forth.

Figure 12C:
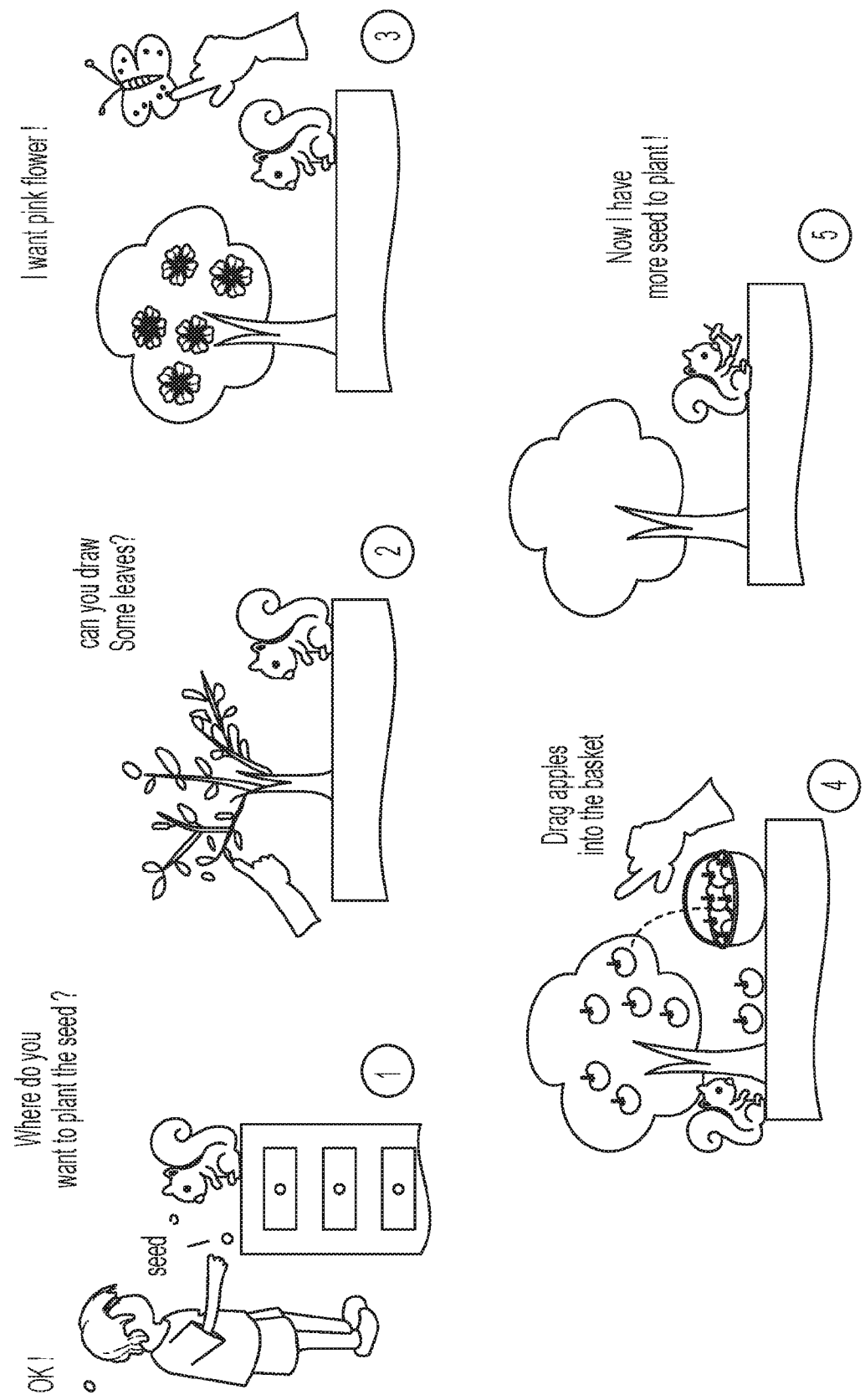

FIG. 12C illustrates an example of growing a tree. For example, the system may help kids learn about nature and use their imaginations to grow, care for, and customize a tree. Kids can choose a spot to plant a virtual seed, use touch to make branches and leaves, use voice-to-text-to-image to "conjure" flowers, and do math to fill a virtual basket with fruit, among other examples.

Figure 12D:
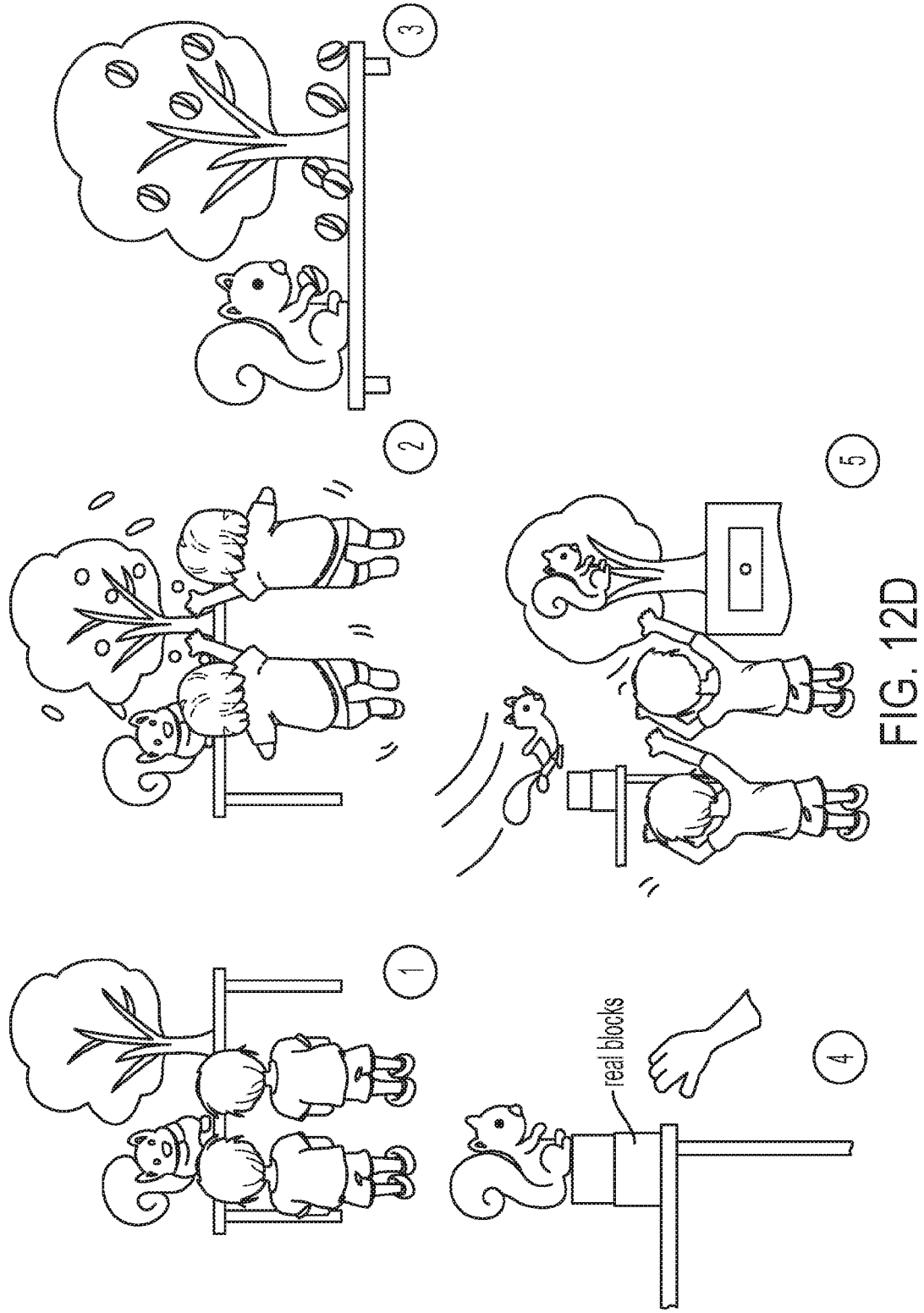

FIG. 12D illustrates an example of controlling natural elements, such as weather and earthquakes. For example, to help their characters get food, kids may use broad arm and body gestures to create virtual earthquakes that cause nuts to drop to the ground, or wave their arms to create virtual wind to allow the character (e.g., a flying squirrel) to glide to its goal.

Example Internet-of-Things (IOT) Implementations

FIGS. 13-16 illustrate examples of Internet-of-Things (IOT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 13:
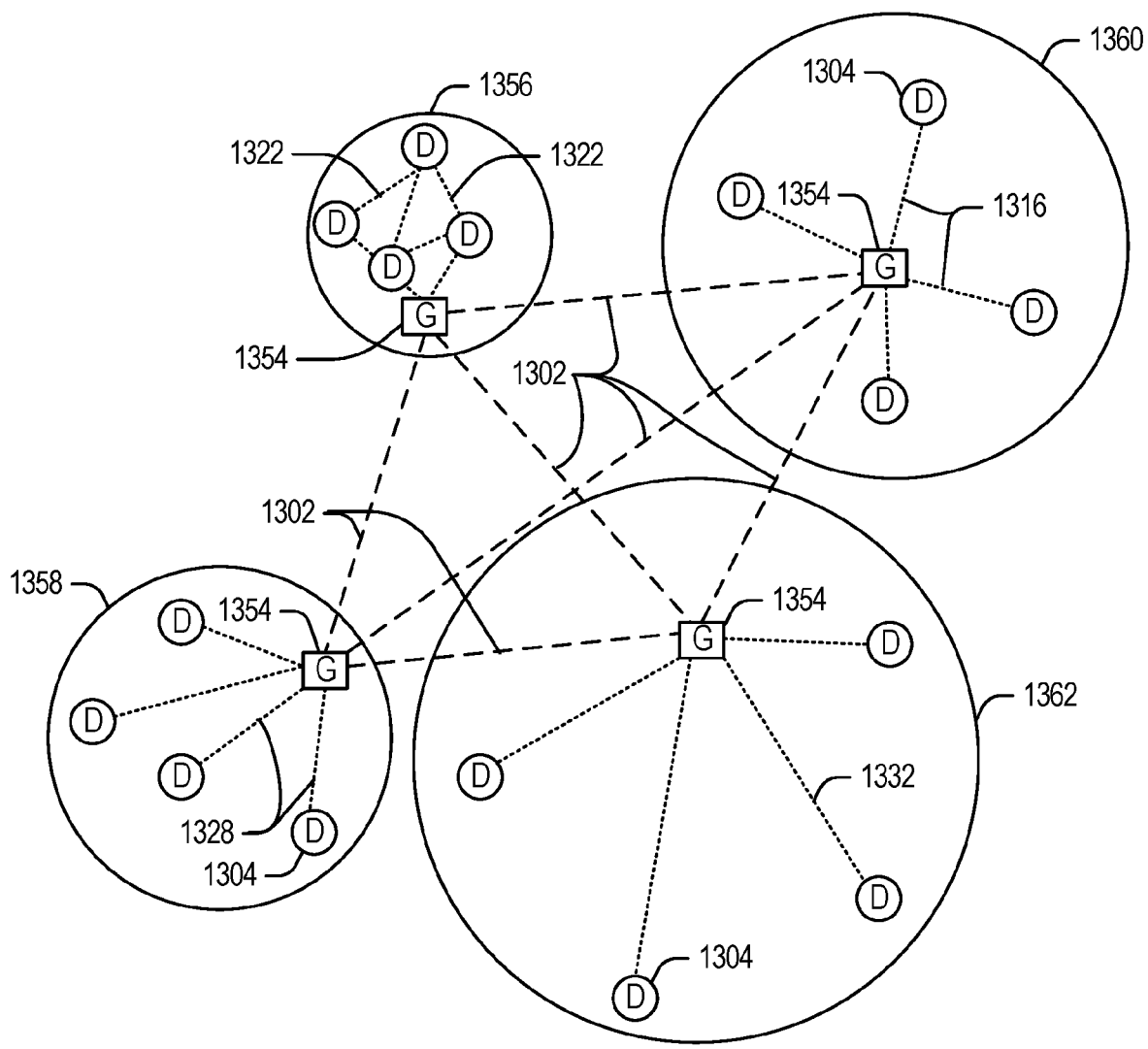
FIGS. 13, 14, 15, and 16 illustrate examples of Internet-of-Things (IOT) networks and architectures that can be used in accordance with certain embodiments.

FIG. 13 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (Qos) terms specified in service level and service delivery agreements. As will be understood, the use of IoT devices and networks, such as those introduced in FIGS. 13-16, present a number of new challenges in a heterogeneous network of connectivity comprising a combination of wired and wireless technologies.

FIG. 13 specifically provides a simplified drawing of a domain topology that may be used for a number of internet-of-things (IOT) networks comprising IoT devices 1304, with the IoT networks 1356, 1358, 1360, 1362, coupled through backbone links 1302 to respective gateways 1354. For example, a number of IoT devices 1304 may communicate with a gateway 1354, and with each other through the gateway 1354. To simplify the drawing, not every IoT device 1304, or communications link (e.g., link 1316, 1322, 1328, or 1332) is labeled. The backbone links 1302 may include any number of wired or wireless technologies, including optical networks, and may be part of a local area network (LAN), a wide area network (WAN), or the Internet. Additionally, such communication links facilitate optical signal paths among both IoT devices 1304 and gateways 1354, including the use of MUXing/deMUXing components that facilitate interconnection of the various devices.

The network topology may include any number of types of IoT networks, such as a mesh network provided with the network 1356 using Bluetooth low energy (BLE) links 1322. Other types of IoT networks that may be present include a wireless local area network (WLAN) network 1358 used to communicate with IoT devices 1304 through IEEE 1302.11 (Wi-Fi®) links 1328, a cellular network 1360 used to communicate with IoT devices 1304 through an LTE/LTE-A (4G) or 5G cellular network, and a low-power wide area (LPWA) network 1362, for example, a LPWA network compatible with the LoRaWan specification promulgated by the LoRa alliance, or a IPV6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1304, such as over the backbone links 1302, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1356, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1358, for instance, may use systems that perform standards conversion to provide multi-standard connectivity, enabling IoT devices 1304 using different protocols to communicate. Further systems may provide seamless interconnectivity across a multi-standard infrastructure comprising visible Internet resources and hidden Internet resources.

Communications in the cellular network 1360, for instance, may be enhanced by systems that offload data, extend communications to more remote devices, or both. The LPWA network 1362 may include systems that perform non-Internet protocol (IP) to IP interconnections, addressing, and routing. Further, each of the IoT devices 1304 may include the appropriate transceiver for wide area communications with that device. Further, each IoT device 1304 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 14 below.

Figure 14:
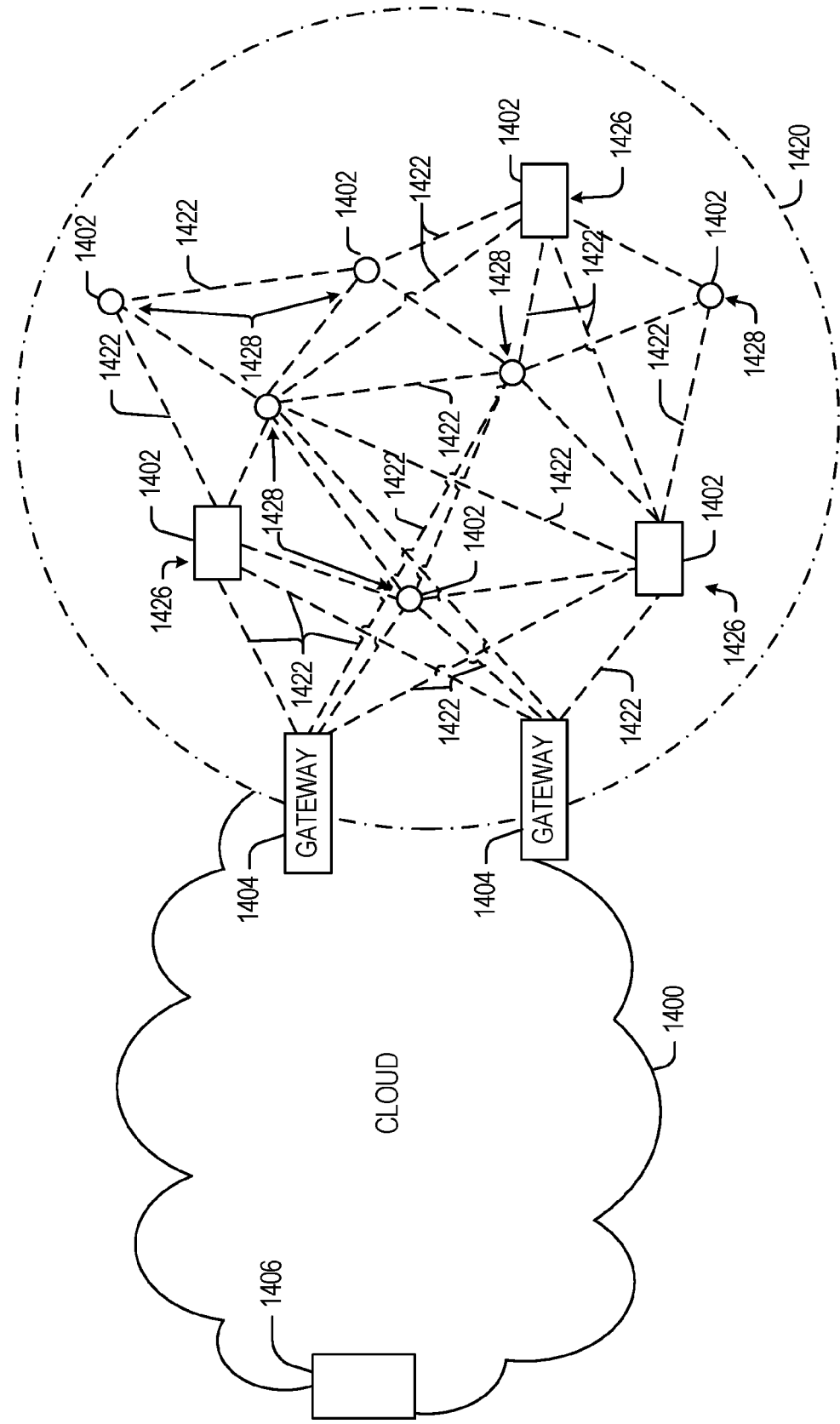

FIG. 14 illustrates a cloud computing network in communication with a mesh network of IoT devices (devices 1402) operating as a fog device at the edge of the cloud computing network. The mesh network of IoT devices may be termed a fog 1420, operating at the edge of the cloud 1400. To simplify the diagram, not every IoT device 1402 is labeled.

The fog 1420 may be considered to be a massively interconnected network wherein a number of IoT devices 1402 are in communications with each other, for example, by radio links 1422. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1402 are shown in this example, gateways 1404, data aggregators 1426, and sensors 1428, although any combinations of IoT devices 1402 and functionality may be used. The gateways 1404 may be edge devices that provide communications between the cloud 1400 and the fog 1420, and may also provide the backend process function for data obtained from sensors 1428, such as motion data, flow data, temperature data, and the like. The data aggregators 1426 may collect data from any number of the sensors 1428, and perform the back-end processing function for the analysis. The results, raw data, or both may be passed along to the cloud 1400 through the gateways 1404. The sensors 1428 may be full IoT devices 1402, for example, capable of both collecting data and processing the data. In some cases, the sensors 1428 may be more limited in functionality, for example, collecting the data and allowing the data aggregators 1426 or gateways 1404 to process the data.

Communications from any IoT device 1402 may be passed along a convenient path (e.g., a most convenient path) between any of the IoT devices 1402 to reach the gateways 1404. In these networks, the number of interconnections provide substantial redundancy, allowing communications to be maintained, even with the loss of a number of IoT devices 1402. Further, the use of a mesh network may allow IoT devices 1402 that are very low power or located at a distance from infrastructure to be used, as the range to connect to another IoT device 1402 may be much less than the range to connect to the gateways 1404.

The fog 1420 provided from these IoT devices 1402 may be presented to devices in the cloud 1400, such as a server 1406, as a single device located at the edge of the cloud 1400, e.g., a fog device. In this example, the alerts coming from the fog device may be sent without being identified as coming from a specific IoT device 1402 within the fog 1420. In this fashion, the fog 1420 may be considered a distributed platform that provides computing and storage resources to perform processing or data-intensive tasks such as data analytics, data aggregation, and machine-learning, among others.

In some examples, the IoT devices 1402 may be configured using an imperative programming style, e.g., with each IoT device 1402 having a specific function and communication partners. However, the IoT devices 1402 forming the fog device may be configured in a declarative programming style, allowing the IoT devices 1402 to reconfigure their operations and communications, such as to determine needed resources in response to conditions, queries, and device failures. As an example, a query from a user located at a server 1406 about the operations of a subset of equipment monitored by the IoT devices 1402 may result in the fog 1420 device selecting the IoT devices 1402, such as particular sensors 1428, needed to answer the query. The data from these sensors 1428 may then be aggregated and analyzed by any combination of the sensors 1428, data aggregators 1426, or gateways 1404, before being sent on by the fog 1420 device to the server 1406 to answer the query. In this example, IoT devices 1402 in the fog 1420 may select the sensors 1428 used based on the query, such as adding data from flow sensors or temperature sensors. Further, if some of the IoT devices 1402 are not operational, other IoT devices 1402 in the fog 1420 device may provide analogous data, if available.

Figure 15:
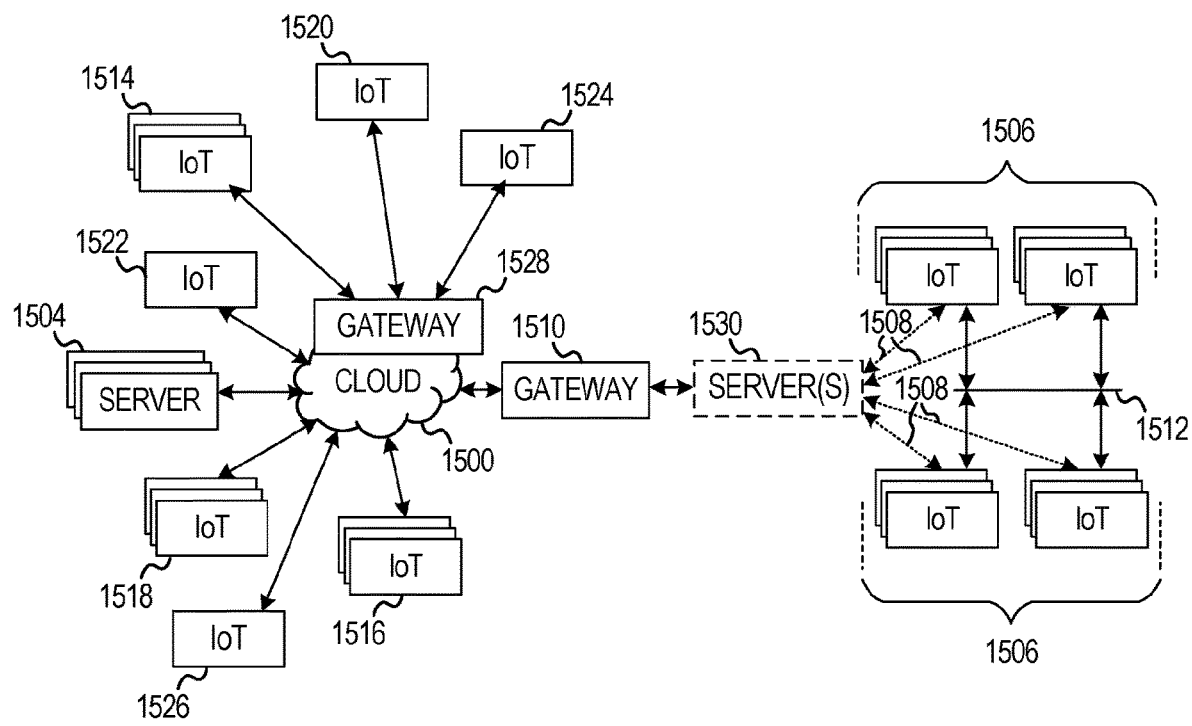

FIG. 15 illustrates a drawing of a cloud computing network, or cloud 1500, in communication with a number of Internet of Things (IOT) devices. The cloud 1500 may represent the Internet, or may be a local area network (LAN), or a wide area network (WAN), such as a proprietary network for a company. The IoT devices may include any number of different types of devices, grouped in various combinations. For example, a traffic control group 1506 may include IoT devices along streets in a city. These IoT devices may include stoplights, traffic flow monitors, cameras, weather sensors, and the like. The traffic control group 1506, or other subgroups, may be in communication with the cloud 1500 through wired or wireless links 1508, such as LPWA links, optical links, and the like. Further, a wired or wireless sub-network 1512 may allow the IoT devices to communicate with each other, such as through a local area network, a wireless local area network, and the like. The IoT devices may use another device, such as a gateway 1510 or 1528 to communicate with remote locations such as the cloud 1500; the IoT devices may also use one or more servers 1530 to facilitate communication with the cloud 1500 or with the gateway 1510. For example, the one or more servers 1530 may operate as an intermediate network node to support a local edge cloud or fog implementation among a local area network. Further, the gateway 1528 that is depicted may operate in a cloud-to-gateway-to-many edge devices configuration, such as with the various IoT devices 1514, 1520, 1524 being constrained or dynamic to an assignment and use of resources in the cloud 1500.

Other example groups of IoT devices may include remote weather stations 1514, local information terminals 1516, alarm systems 1518, automated teller machines 1520, alarm panels 1522, or moving vehicles, such as emergency vehicles 1524 or other vehicles 1526, among many others. Each of these IoT devices may be in communication with other IoT devices, with servers 1504, with another IoT fog device or system (not shown, but depicted in FIG. 14), or a combination therein. The groups of IoT devices may be deployed in various residential, commercial, and industrial settings (including in both private or public environments).

As can be seen from FIG. 15, a large number of IoT devices may be communicating through the cloud 1500. This may allow different IoT devices to request or provide information to other devices autonomously. For example, a group of IoT devices (e.g., the traffic control group 1506) may request a current weather forecast from a group of remote weather stations 1514, which may provide the forecast without human intervention. Further, an emergency vehicle 1524 may be alerted by an automated teller machine 1520 that a burglary is in progress. As the emergency vehicle 1524 proceeds towards the automated teller machine 1520, it may access the traffic control group 1506 to request clearance to the location, for example, by lights turning red to block cross traffic at an intersection in sufficient time for the emergency vehicle 1524 to have unimpeded access to the intersection.

Clusters of IoT devices, such as the remote weather stations 1514 or the traffic control group 1506, may be equipped to communicate with other IoT devices as well as with the cloud 1500. This may allow the IoT devices to form an ad-hoc network between the devices, allowing them to function as a single device, which may be termed a fog device or system (e.g., as described above with reference to FIG. 14).

Figure 16:
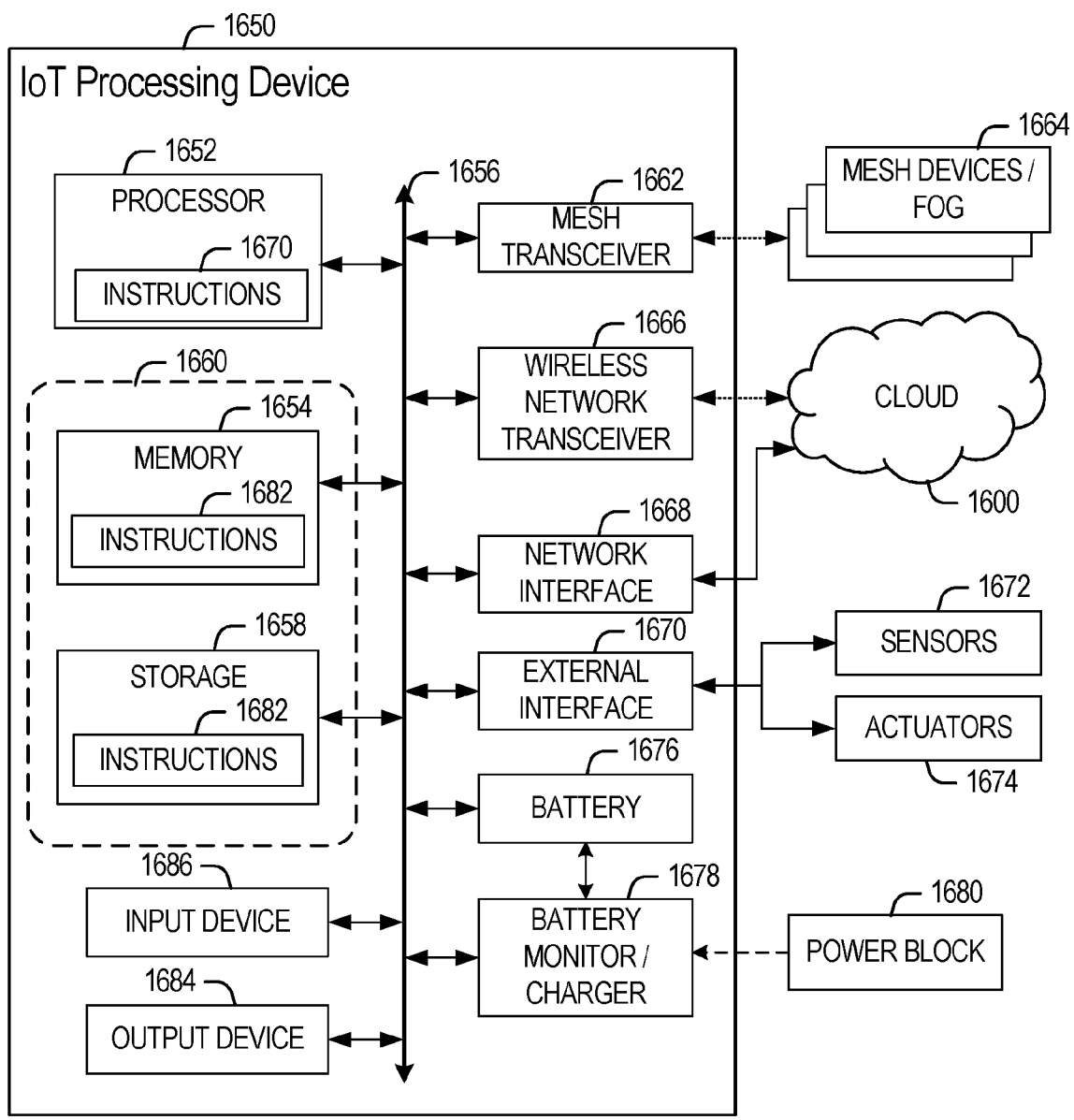

FIG. 16 is a block diagram of an example of components that may be present in an IoT device 1650 for implementing the techniques described herein. The IoT device 1650 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1650, or as components otherwise incorporated within a chassis of a larger system. Additionally, the block diagram of FIG. 16 is intended to depict a high-level view of components of the IoT device 1650. However, some of the components shown may be omitted, additional components may be present, and different arrangement of the components shown may occur in other implementations.

The IoT device 1650 may include a processor 1652, which may be a microprocessor, a multi-core processor, a multithreaded processor, an ultra-low voltage processor, an embedded processor, or other known processing element. The processor 1652 may be a part of a system on a chip (SoC) in which the processor 1652 and other components are formed into a single integrated circuit, or a single package, such as the Edison™ or Galileo™ SoC boards from Intel. As an example, the processor 1652 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1652 may communicate with a system memory 1654 over an interconnect 1656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1658 may also couple to the processor 1652 via the interconnect 1656. In an example, the storage 1658 may be implemented via a solid state disk drive (SSDD). Other devices that may be used for the storage 1658 include flash memory cards, such as SD cards, microSD cards, xD picture cards, and the like, and USB flash drives. In low power implementations, the storage 1658 may be on-die memory or registers associated with the processor 1652. However, in some examples, the storage 1658 may be implemented using a micro hard disk drive (HDD). Further, any number of new technologies may be used for the storage 1658 in addition to, or instead of, the technologies described, such resistance change memories, phase change memories, holographic memories, or chemical memories, among others.

The components may communicate over the interconnect 1656. The interconnect 1656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1656 may be a proprietary bus, for example, used in a SoC based system. Other bus systems may be included, such as an I2C interface, an SPI interface, point to point interfaces, and a power bus, among others.

The interconnect 1656 may couple the processor 1652 to a mesh transceiver 1662, for communications with other mesh devices 1664. The mesh transceiver 1662 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1664. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1662 may communicate using multiple standards or radios for communications at different range. For example, the IoT device 1650 may communicate with close devices, e.g., within about 10 meters, using a local transceiver based on BLE, or another low power radio, to save power. More distant mesh devices 1664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1666 may be included to communicate with devices or services in the cloud 1600 via local or wide area network protocols. The wireless network transceiver 1666 may be a LPWA transceiver that follows the IEEE 802.15.4, or IEEE 802.15.4g standards, among others. The IoT device 1650 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1662 and wireless network transceiver 1666, as described herein. For example, the radio transceivers 1662 and 1666 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1662 and 1666 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1666, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1668 may be included to provide a wired communication to the cloud 1600 or to other devices, such as the mesh devices 1664. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1668 may be included to allow connect to a second network, for example, a NIC 1668 providing communications to the cloud over Ethernet, and a second NIC 1668 providing communications to other devices over another type of network.

The interconnect 1656 may couple the processor 1652 to an external interface 1670 that is used to connect external devices or subsystems. The external devices may include sensors 1672, such as accelerometers, level sensors, flow sensors, optical light sensors, camera sensors, temperature sensors, a global positioning system (GPS) sensors, pressure sensors, barometric pressure sensors, and the like. The external interface 1670 further may be used to connect the IoT device 1650 to actuators 1674, such as power switches, valve actuators, an audible sound generator, a visual warning device, and the like.

In some optional examples, various input/output (I/O) devices may be present within, or connected to, the IoT device 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1650.

A battery 1676 may power the IoT device 1650, although in examples in which the IoT device 1650 is mounted in a fixed location, it may have a power supply coupled to an electrical grid. The battery 1676 may be a lithium ion battery, or a metal-air battery, such as a zinc-air battery, an aluminum-air battery, a lithium-air battery, and the like.

A battery monitor/charger 1678 may be included in the IoT device 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1678 may communicate the information on the battery 1676 to the processor 1652 over the interconnect 1656. The battery monitor/charger 1678 may also include an analog-to-digital (ADC) convertor that allows the processor 1652 to directly monitor the voltage of the battery 1676 or the current flow from the battery 1676. The battery parameters may be used to determine actions that the IoT device 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the IoT device 1650. A wireless battery charging circuit, such as an LTC4020 chip from Linear Technologies of Milpitas, California, among others, may be included in the battery monitor/charger 1678. The specific charging circuits chosen depend on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application specific integrated circuit (ASIC).

In an example, the instructions 1682 provided via the memory 1654, the storage 1658, or the processor 1652 may be embodied as a non-transitory, machine readable medium 1660 including code to direct the processor 1652 to perform electronic operations in the IoT device 1650. The processor 1652 may access the non-transitory, machine readable medium 1660 over the interconnect 1656. For instance, the non-transitory, machine readable medium 1660 may include storage units such as optical disks, flash drives, or any number of other hardware devices. The non-transitory, machine readable medium 1660 may include instructions to direct the processor 1652 to perform a specific sequence or flow of actions, for example, as described with respect to the flowchart(s) and diagram(s) of operations and functionality described throughout this disclosure.

Example Computing Architectures

Figure 17:
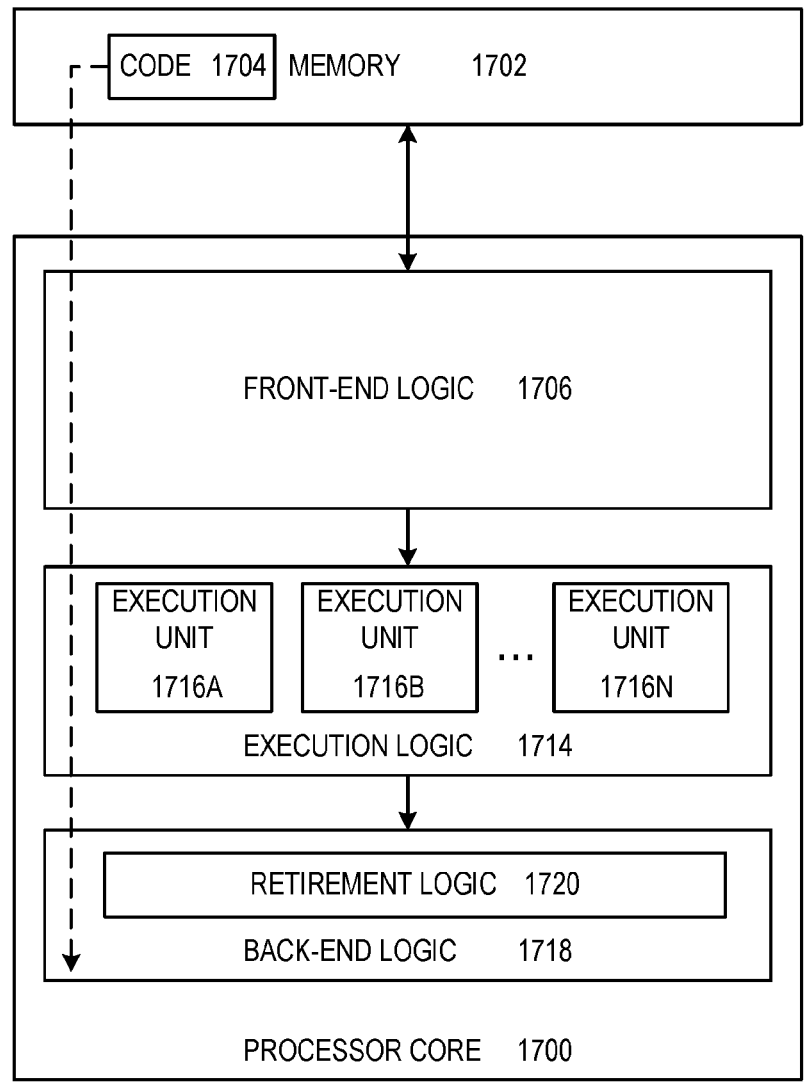
FIGS. 17 and 18 illustrate example computer architectures that can be used in accordance with certain embodiments.
Figure 18:
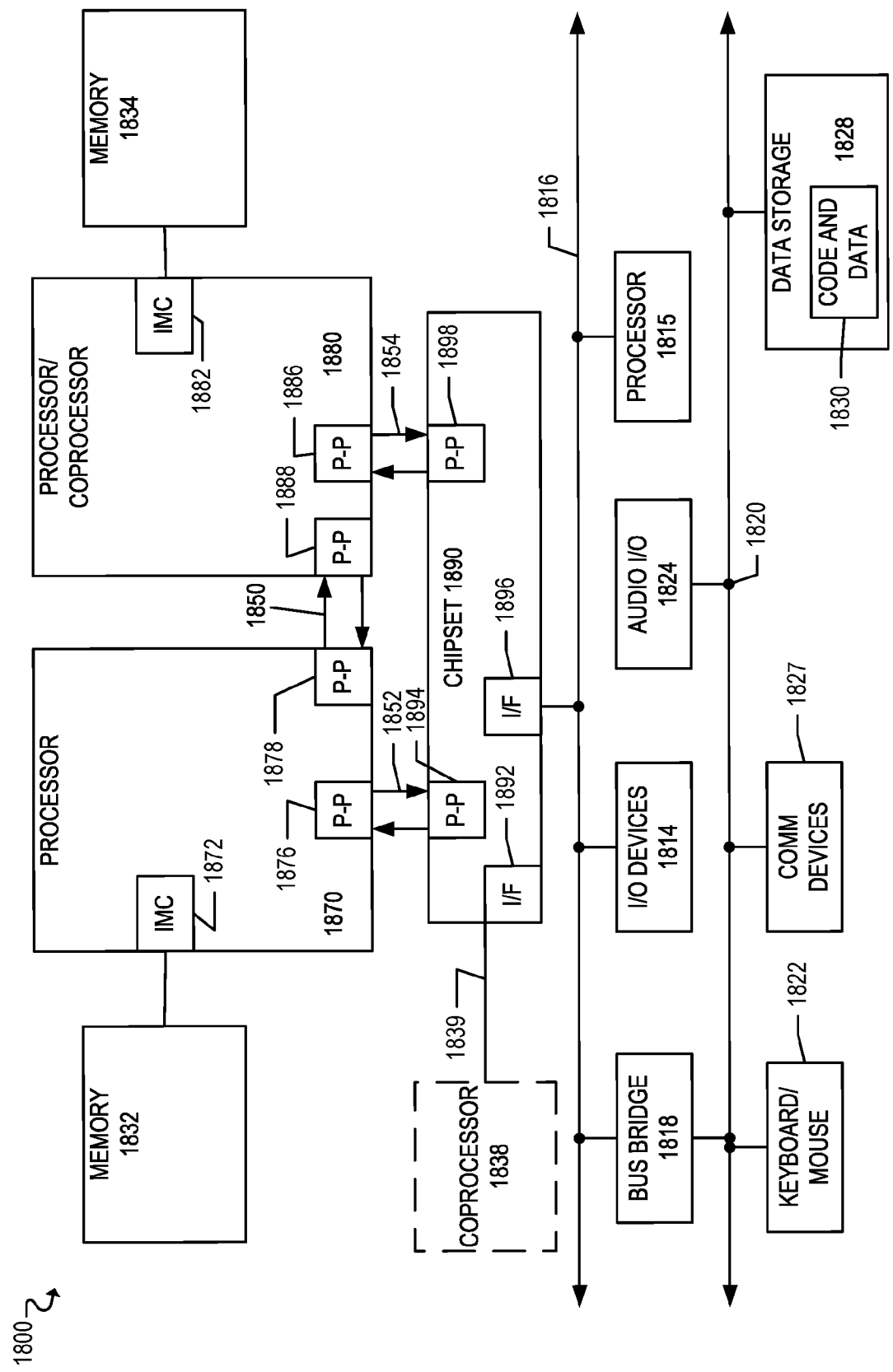

FIGS. 17 and 18 illustrate example computer processor architectures that can be used in accordance with embodiments disclosed herein. For example, in various embodiments, the computer architectures of FIGS. 17 and 18 may be used to implement the interactive environments and functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 17 illustrates a block diagram for an example embodiment of a processor 1700. Processor 1700 is an example of a type of hardware device that can be used in connection with the embodiments described throughout this disclosure. Processor 1700 may be any type of processor, such as a microprocessor, an embedded processor, a digital signal processor (DSP), a network processor, a multi-core processor, a single core processor, or other device to execute code. Although only one processor 1700 is illustrated in FIG. 17, a processing element may alternatively include more than one of processor 1700 illustrated in FIG. 17. Processor 1700 may be a single-threaded core or, for at least one embodiment, the processor 1700 may be multi-threaded in that it may include more than one hardware thread context (or "logical processor") per core.

FIG. 17 also illustrates a memory 1702 coupled to processor 1700 in accordance with an embodiment. Memory 1702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1700 can execute any type of instructions associated with algorithms, processes, or operations detailed herein. Generally, processor 1700 can transform an element or an article (e.g., data) from one state or thing to another state or thing.

Code 1704, which may be one or more instructions to be executed by processor 1700, may be stored in memory 1702, or may be stored in software, hardware, firmware, or any suitable combination thereof, or in any other internal or external component, device, element, or object where appropriate and based on particular needs. In one example, processor 1700 can follow a program sequence of instructions indicated by code 1704. Each instruction enters a front-end logic 1706 and is processed by one or more decoders 1708. The decoder may generate, as its output, a micro operation such as a fixed width micro operation in a predefined format, or may generate other instructions, microinstructions, or control signals that reflect the original code instruction. Front-end logic 1706 may also include register renaming logic and scheduling logic, which generally allocate resources and queue the operation corresponding to the instruction for execution.

Processor 1700 can also include execution logic 1714 having a set of execution units 1716*a*, 1716*b*, 1716*n*, etc. Some embodiments may include a number of execution units dedicated to specific functions or sets of functions. Other embodiments may include only one execution unit or one execution unit that can perform a particular function. Execution logic 1714 performs the operations specified by code instructions.

After completion of execution of the operations specified by the code instructions, back-end logic 1718 can retire the instructions of code 1704. In one embodiment, processor 1700 allows out of order execution but requires in order retirement of instructions. Retirement logic 1720 may take a variety of known forms (e.g., re-order buffers or the like). In this manner, processor 1700 is transformed during execution of code 1704, at least in terms of the output generated by the decoder, hardware registers and tables utilized by register renaming logic 1710, and any registers (not shown) modified by execution logic 1714.

Although not shown in FIG. 17, a processing element may include other elements on a chip with processor 1700. For example, a processing element may include memory control logic along with processor 1700. The processing element may include I/O control logic and/or may include I/O control logic integrated with memory control logic. The processing element may also include one or more caches. In some embodiments, non-volatile memory (such as flash memory or fuses) may also be included on the chip with processor 1700.

FIG. 18 illustrates a block diagram for an example embodiment of a multiprocessor 1800. As shown in FIG. 18, multiprocessor system 1800 is a point-to-point interconnect system, and includes a first processor 1870 and a second processor 1880 coupled via a point-to-point interconnect 1850. In some embodiments, each of processors 1870 and 1880 may be some version of processor 1700 of FIG. 17.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of this disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

All or part of any component of FIG. 18 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLE IMPLEMENTATIONS

The following examples pertain to embodiments described throughout this disclosure.

One or more embodiments may include an apparatus, comprising: a memory to store sensor data, wherein the sensor data is captured by a plurality of sensors within an educational environment; and a processor to: access the sensor data captured by the plurality of sensors; identify a student within the educational environment based on the sensor data; detect a plurality of events associated with the student based on the sensor data, wherein each event is indicative of an attention level of the student within the educational environment; generate a report based on the plurality of events associated with the student; and send the report to a third party associated with the student.

In one example embodiment of an apparatus: the plurality of sensors comprises a camera and a microphone; and the sensor data comprises visual data captured by the camera and audio data captured by the microphone.

In one example embodiment of an apparatus, the processor to identify the student within the educational environment based on the sensor data is further to: determine an identity of the student based on the visual data captured by the camera, wherein facial recognition is performed on the visual data to determine the identity of the student.

In one example embodiment of an apparatus, the processor to detect the plurality of events associated with the student based on the sensor data is further to: detect a first event based on the visual data captured by the camera; and detect a second event based on the audio data captured by the microphone.

In one example embodiment of an apparatus: the plurality of sensors further comprises an RFID reader; the sensor data further comprises RFID data captured by the RFID reader; and the processor to identify the student within the educational environment based on the sensor data is further to: detect an RFID tag associated with the student, wherein the RFID tag is detected based on the RFID data captured by the RFID reader; and determine an identity of the student based on the RFID tag.

In one example embodiment of an apparatus, the processor to generate the report based on the plurality of events associated with the student is further to: extract a plurality of video clips associated with the plurality of events, wherein the plurality of video clips is extracted from the visual data captured by the camera; remove privacy-sensitive visual data from the plurality of video clips, wherein the privacy-sensitive visual data indicates an identity of one or more second students; and generate a video summary of the student based on the plurality of video clips.

In one example embodiment of an apparatus, the processor to generate the report based on the plurality of events associated with the student is further to: derive a performance level for the student based on the plurality of events, wherein the performance level is derived based on a machine learning model trained to classify student performance based on detected events and student performance records.

In one example embodiment of an apparatus: the educational environment comprises a school classroom; and the third party comprises a parent of the student.

In one example embodiment of an apparatus, the processor is further to: send a real-time notification to the parent about a particular event of the plurality of events; and receive real-time feedback from the parent about the particular event.

In one example embodiment of an apparatus, the plurality of events comprises: an interactive event associated with interactive behavior of the student; a disengaged event associated with disengaged behavior of the student; or a distractive event associated with distractive behavior of the student.

In one example embodiment of an apparatus: the interactive event comprises the student asking a question to a teacher; the disengaged event comprises the student looking away from the teacher; or the distractive event comprises the student talking to another student.

One or more embodiments may include a system, comprising: a plurality of sensors to capture sensor data associated with an educational environment; a communication interface to communicate over a network; and one or more processing devices to: access the sensor data captured by the plurality of sensors; identify a student within the educational environment based on the sensor data; detect a plurality of events associated with the student based on the sensor data, wherein each event is indicative of an attention level of the student within the educational environment; generate a report based on the plurality of events associated with the student; and send, via the communication interface, the report to a third party associated with the student.

In one example embodiment of a system, the system further comprises a touch-enabled display to display interactive content within the educational environment.

In one example embodiment of a system: the plurality of sensors comprises: a camera; a microphone; and an RFID reader; the sensor data comprises: visual data captured by the camera; audio data captured by the microphone; and RFID data captured by the RFID reader.

In one example embodiment of a system, the one or more processing devices to generate the report based on the plurality of events associated with the student are further to: extract a plurality of video clips associated with the plurality of events, wherein the plurality of video clips is extracted from the visual data captured by the camera; remove privacy-sensitive visual data from the plurality of video clips, wherein the privacy-sensitive visual data indicates an identity of one or more second students; and generate a video summary of the student based on the plurality of video clips.

In one example embodiment of a system, the one or more processing devices to generate the report based on the plurality of events associated with the student are further to: derive a performance level for the student based on the plurality of events, wherein the performance level is derived based on a machine learning model trained to classify student performance based on detected events and student performance records.

In one example embodiment of a system: the educational environment comprises a school classroom; the third party comprises a parent of the student; and the one or more processing devices are further to: send, via the communication interface, a real-time notification to the parent about a particular event of the plurality of events; and receive, via the communication interface, real-time feedback from the parent about the particular event.

One or more embodiments may include at least one machine accessible storage medium having instructions stored thereon, wherein the instructions, when executed on a machine, cause the machine to: access sensor data captured by a plurality of sensors within an educational environment, wherein the plurality of sensors comprises a camera and a microphone, and wherein the sensor data comprises visual data captured by the camera and audio data captured by the microphone; identify a student within the educational environment based on the sensor data; detect a plurality of events associated with the student based on the sensor data, wherein each event is indicative of an attention level of the student within the educational environment; generate a report based on the plurality of events associated with the student; and send the report to a third party associated with the student.

In one example embodiment of a storage medium, the instructions that cause the machine to generate the report based on the plurality of events associated with the student further cause the machine to: extract a plurality of video clips associated with the plurality of events, wherein the plurality of video clips is extracted from the visual data captured by the camera; remove privacy-sensitive visual data from the plurality of video clips, wherein the privacy-sensitive visual data indicates an identity of one or more second students; and generate a video summary of the student based on the plurality of video clips.

In one example embodiment of a storage medium, the instructions that cause the machine to generate the report based on the plurality of events associated with the student further cause the machine to: derive a performance level for the student based on the plurality of events, wherein the performance level is derived based on a machine learning model trained to classify student performance based on detected events and student performance records.

In one example embodiment of a storage medium: the educational environment comprises a school classroom; the third party comprises a parent of the student; and the instructions further cause the machine to: send a real-time notification to the parent about a particular event of the plurality of events; and receive real-time feedback from the parent about the particular event.

One or more embodiments may include a method, comprising: accessing sensor data captured by a plurality of sensors within an educational environment, wherein the plurality of sensors comprises a camera and a microphone, and wherein the sensor data comprises visual data captured by the camera and audio data captured by the microphone; identifying a student within the educational environment based on the sensor data; detecting a plurality of events associated with the student based on the sensor data, wherein each event is indicative of an attention level of the student within the educational environment; generating a report based on the plurality of events associated with the student; and sending the report to a third party associated with the student.

In one example embodiment of a method, generating the report based on the plurality of events associated with the student comprises: extracting a plurality of video clips associated with the plurality of events, wherein the plurality of video clips is extracted from the visual data captured by the camera; removing privacy-sensitive visual data from the plurality of video clips, wherein the privacy-sensitive visual data indicates an identity of one or more second students; and generating a video summary of the student based on the plurality of video clips.

In one example embodiment of a method, generating the report based on the plurality of events associated with the student comprises: deriving a performance level for the student based on the plurality of events, wherein the performance level is derived based on a machine learning model trained to classify student performance based on detected events and student performance records.

In one example embodiment of a method: the educational environment comprises a school classroom; the third party comprises a parent of the student; and the method further comprises: sending a real-time notification to the parent about a particular event of the plurality of events; and receiving real-time feedback from the parent about the particular event.

One or more embodiments may include an apparatus, comprising: a physical network interface to communicate with a plurality of immersive reality sessions over a network; a main memory; a processor comprising a processor cache, wherein the processor is to execute a plurality of virtual machines corresponding to the plurality of immersive reality sessions, wherein the plurality of virtual machines is to enable the plurality of immersive reality sessions to interact; an accelerator circuit comprising: an accelerator cache; and a plurality of hardware accelerators, wherein the plurality of hardware accelerators comprises one or more infrastructure accelerators and one or more application accelerators; and an interconnect to enable the processor and the accelerator circuit to share access to a coherent memory space, wherein the coherent memory space comprises the main memory, the processor cache, and the accelerator cache.

In one example embodiment of an apparatus, the processor further comprises a plurality of processing cores to execute the plurality of virtual machines, wherein each virtual machine is to be executed on a particular processing core.

In one example embodiment of an apparatus, the one or more infrastructure accelerators comprise one or more crossbar switches to accelerate communication between a plurality of components within the apparatus.

In one example embodiment of an apparatus, one or more crossbar switches comprise one or more direct memory access controllers.

In one example embodiment of an apparatus: the plurality of virtual machines comprises a plurality of virtual network interfaces; and the one or more infrastructure accelerators are to accelerate communication between the physical network interface and the plurality of virtual network interfaces.

In one example embodiment of an apparatus, the one or more infrastructure accelerators are further to accelerate communication among the plurality of virtual network interfaces.

In one example embodiment of an apparatus, the one or more infrastructure accelerators are to accelerate communication between the plurality of virtual machines and the plurality of hardware accelerators.

In one example embodiment of an apparatus, the one or more infrastructure accelerators are to accelerate communication among the plurality of hardware accelerators.

In one example embodiment of an apparatus, the one or more application accelerators are to accelerate one or more workloads for the plurality of virtual machines.

In one example embodiment of an apparatus, the one or more workloads are associated with one or more immersive reality algorithms.

In one example embodiment of an apparatus, the interconnect comprises a plurality of physical interfaces between the processor and the accelerator circuit.

In one example embodiment of an apparatus, the plurality of physical interfaces comprises: one or more coherent interfaces; and one or more non-coherent interfaces.

In one example embodiment of an apparatus: a plurality of virtual channels is established over the plurality of physical interfaces between the processor and the accelerator circuit; and the plurality of virtual channels is assigned to a plurality of workloads associated with the plurality of hardware accelerators, wherein the plurality of virtual channels is assigned based on virtual channel criteria.

In one example embodiment of an apparatus, the virtual channel criteria comprises: a cache hint; a data payload size; and a link utilization.

In one example embodiment of an apparatus, the accelerator circuit comprises a field-programmable gate array (FPGA), wherein the FPGA enables the plurality of hardware accelerators to be programmable.

In one example embodiment of an apparatus, the accelerator circuit comprises an application-specific integrated circuit (ASIC).

What is claimed is:

1. A computing device, comprising:
   a physical network interface to communicate with a plurality of user devices over a network;
   a main memory;
   a processor comprising a processor cache and one or more processing cores, wherein the one or more processing cores are to execute a plurality of virtual machines, wherein the virtual machines are to establish a plurality of immersive reality sessions with the user devices and enable the immersive reality sessions to interact;
   an accelerator circuit comprising:
      an accelerator cache; and
      a plurality of hardware accelerators, wherein the hardware accelerators comprise one or more infrastructure accelerators and one or more application accelerators; and
   an interconnect to enable the processor and the accelerator circuit to share access to a coherent memory space, wherein the coherent memory space comprises the main memory, the processor cache, and the accelerator cache.

2. The computing device of claim 1, wherein the one or more processing cores comprise a plurality of processing cores to execute the virtual machines, wherein each virtual machine is to be executed on one of the processing cores.

3. The computing device of claim 1, wherein the one or more infrastructure accelerators comprise one or more crossbar switches to accelerate communication between a plurality of components within the computing device.

4. The computing device of claim 3, wherein the one or more crossbar switches comprise one or more direct memory access controllers.

5. The computing device of claim 1, wherein:
   the virtual machines comprise a plurality of virtual network interfaces, wherein each virtual machine comprises one of the virtual network interfaces; and
   the one or more infrastructure accelerators are to accelerate communication between the physical network interface and the virtual network interfaces.

6. The computing device of claim 5, wherein the one or more infrastructure accelerators are further to accelerate communication among the virtual network interfaces.

7. The computing device of claim 1, wherein the one or more infrastructure accelerators are to accelerate communication between the virtual machines and the hardware accelerators.

8. The computing device of claim 1, wherein the one or more infrastructure accelerators are to accelerate communication among the hardware accelerators.

9. The computing device of claim 1, wherein the one or more application accelerators are to accelerate one or more workloads for the virtual machines.

10. The computing device of claim 9, wherein the one or more workloads are associated with one or more immersive reality algorithms.

11. The computing device of claim 1, wherein the interconnect comprises a plurality of physical interfaces between the processor and the accelerator circuit.

12. The computing device of claim 11, wherein the physical interfaces comprise:
    one or more coherent interfaces; and
    one or more non-coherent interfaces.

13. The computing device of claim 11, wherein:
    a plurality of virtual channels are established over the physical interfaces between the processor and the accelerator circuit; and
    the virtual channels are assigned to a plurality of workloads associated with the hardware accelerators based on virtual channel criteria.

14. The computing device of claim 13, wherein the virtual channel criteria comprises:
    a cache hint;
    a data payload size; and
    a link utilization.

15. The computing device of claim 1, wherein the accelerator circuit comprises a field-programmable gate array (FPGA), wherein the FPGA enables the hardware accelerators to be programmable.

16. At least one non-transitory machine-readable storage medium having instructions stored thereon, wherein the instructions, when executed on a computing device, cause the computing device to:
    execute a plurality of virtual machines on a plurality of processing cores of a processor, wherein each virtual machine is executed on one of the processing cores;
    establish a plurality of immersive reality sessions with a plurality of user devices over a network, wherein each immersive reality session is established on one of the virtual machines and with one of the user devices;
    accelerate one or more immersive reality workloads for the immersive reality sessions on one or more application accelerators; and
    accelerate one or more input/output (I/O) operations for the immersive reality sessions on one or more infrastructure accelerators.

17. The storage medium of claim 16, wherein the instructions that cause the computing device to accelerate the one or more I/O operations for the immersive reality sessions on the one or more infrastructure accelerators further cause the computing device to:
    accelerate communication between a physical network interface of the computing device and a plurality of virtual network interfaces of the virtual machines; and
    accelerate communication among the virtual network interfaces.

18. The storage medium of claim 17, wherein the one or more infrastructure accelerators comprise one or more crossbar switches to accelerate communication between the physical network interface and the virtual network interfaces and to accelerate communication among the virtual network interfaces.

19. The storage medium of claim 16, wherein the instructions that cause the computing device to accelerate the one or more I/O operations for the immersive reality sessions on the one or more infrastructure accelerators further cause the computing device to:
    accelerate communication between the virtual machines and the one or more application accelerators; and
    accelerate communication among the one or more application accelerators, wherein the one or more application accelerators comprise a plurality of application accelerators.

20. The storage medium of claim 16, wherein the instructions further cause the computing device to:
    share access to a coherent memory space via a coherent interconnect, wherein:
        the coherent memory space comprises a main memory, a processor cache, and an accelerator cache; and
        the coherent interconnect enables the coherent memory space to be shared among the processor and the one or more application accelerators.

* * * * *